United States Patent
Barajas Zamora et al.

(10) Patent No.: US 11,869,033 B2
(45) Date of Patent: Jan. 9, 2024

(54) CONTENT ITEM SELECTION AND MEASUREMENT DETERMINATION

(71) Applicant: Oath Inc., New York, NY (US)

(72) Inventors: Joel Barajas Zamora, Fremont, CA (US); Lakshmi Narayan Bhamidipati, Sunnyvale, CA (US); Aaron Eliasib Flores, Menlo Park, CA (US); Benjamin Grant Jackson, Minneapolis, MN (US); Parag Bhattacharjee, San Ramon, CA (US); Balaji Srinivasa Rao Paladugu, Sunnyvale, CA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 16/707,405

(22) Filed: Dec. 9, 2019

(65) Prior Publication Data
US 2021/0174389 A1     Jun. 10, 2021

(51) Int. Cl.
*G06Q 30/00* (2023.01)
*G06Q 30/0242* (2023.01)
*G06Q 30/0273* (2023.01)

(52) U.S. Cl.
CPC ..... *G06Q 30/0243* (2013.01); *G06Q 30/0246* (2013.01); *G06Q 30/0275* (2013.01)

(58) Field of Classification Search
None
See application file for complete search history.

(56) References Cited

U.S. PATENT DOCUMENTS

| | | | | |
|---|---|---|---|---|
| 9,747,618 | B1 * | 8/2017 | Reiss | G06Q 30/0275 |
| 10,387,921 | B1 * | 8/2019 | Lewis | G06Q 30/0275 |
| 2010/0049602 | A1 * | 2/2010 | Softky | G06Q 30/0246 |
| | | | | 705/14.45 |
| 2015/0206196 | A1 * | 7/2015 | Karande | G06Q 30/0275 |
| | | | | 705/14.71 |
| 2015/0287096 | A1 * | 10/2015 | Jacobsson | G06Q 30/0275 |
| | | | | 705/14.71 |
| 2016/0203522 | A1 * | 7/2016 | Shiffert | G06Q 30/0267 |
| | | | | 705/14.58 |

(Continued)

OTHER PUBLICATIONS

Ad Spend Reporting, Jul. 4, 2016, www.adspeed.com, printed through www.archive.org (Year: 2016).*

(Continued)

*Primary Examiner* — Naresh Vig
(74) *Attorney, Agent, or Firm* — Cooper Legal Group LLC

(57) ABSTRACT

One or more computing devices, systems, and/or methods for selecting content items for transmission to client devices are provided. A first content item may be transmitted to a first set of client devices. A first request for content associated with a first client device of a second set of client devices may be received. A first bid value associated with a second content item may be selected. The first bid value may be modified based upon a second bid value associated with the first content item to generate a third bid value associated with the second content item. The second content item may be selected from a first plurality of content items for presentation via the first client device based upon a plurality of bid values having the third bid value. The second content item may be transmitted to the first client device.

20 Claims, 9 Drawing Sheets

(56) References Cited

U.S. PATENT DOCUMENTS

| | | | | |
|---|---|---|---|---|
| 2016/0292714 A1* | 10/2016 | Bhalgat | ............... | G06Q 30/0242 |
| 2016/0335659 A1* | 11/2016 | Lewis | ................ | G06Q 30/0244 |
| 2017/0213238 A1* | 7/2017 | Bhalgat | ............... | G06Q 30/0275 |
| 2019/0130333 A1* | 5/2019 | Li | ......................... | G06F 16/285 |
| 2019/0180330 A1* | 6/2019 | Fein | ................... | G06Q 30/0275 |

OTHER PUBLICATIONS

Options for modifying datasets, 2017, General Electric Company (Year: 2017).*
Alice Wu, Control design for pacing advertisement budgets, Feb. 23, 2016, www.quantcast.com (Year: 2016).*
Five advantages of using global variables, Feb. 21, 2014, ITT Technical Institute (Year: 2014).*
Why Marketers Should (Almost) Always Use Control and Test Groups, Oct. 13, 2016, www.Braze.com (Year: 2016).*

* cited by examiner

CONTENT ITEM SELECTION AND MEASUREMENT DETERMINATION

BACKGROUND

Many services, such as websites, applications, etc. may provide platforms for viewing media. For example, a user may interact with a service. While interacting with the service, selected media may be presented to the user automatically. Some of the media may be advertisements advertising products and/or services associated with a company. The company may want measurements on an impact that the advertisements have on consumers (e.g., whether the advertisements have an effect on driving consumers to purchase and/or use the products and/or services).

SUMMARY

In accordance with the present disclosure, one or more computing devices and/or methods are provided. In an example, a first content item associated with a content campaign may be transmitted to a first set of client devices. A first request for content associated with a first client device may be received. A first plurality of bid values associated with a first plurality of content items may be determined. Determination of the first plurality of bid values may comprise selecting a first bid value associated with a second content item. Determination of the first plurality of bid values may comprise modifying, based upon a second bid value associated with the first content item, the first bid value to generate a third bid value associated with the second content item. The first plurality of bid values may comprise the third bid value. The second content item may be selected from the first plurality of content items for presentation via the first client device based upon the first plurality of bid values. One or more first content items may be transmitted to a second set of client devices. Transmitting the one or more first content items to the second set of client devices may comprise transmitting the second content item to the first client device based upon the selection of the second content item for presentation via the first client device.

In an example, a first content item associated with a content campaign may be transmitted to a first set of client devices. A first request for content associated with a first client device may be received. A first plurality of bid values associated with a first plurality of content items may be determined. Determination of the first plurality of bid values may comprise selecting a first bid value associated with a second content item. Determination of the first plurality of bid values may comprise modifying, based upon a second bid value associated with the first content item, the first bid value to generate a third bid value associated with the second content item. The first plurality of bid values may comprise the third bid value. The second content item may be selected from the first plurality of content items for presentation via the first client device. One or more first content items may be transmitted to a second set of client devices. Transmitting the one or more first content items to the second set of client devices may comprise transmitting the second content item to the first client device based upon the selection of the second content item for presentation via the first client device. Activity associated with the first set of client devices may be analyzed to determine first conversion information associated with the first set of client devices. Activity associated with the second set of client devices may be analyzed to determine second conversion information associated with the second set of client devices. A measurement report associated with the content campaign may be generated based upon the first conversion information and/or the second conversion information.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
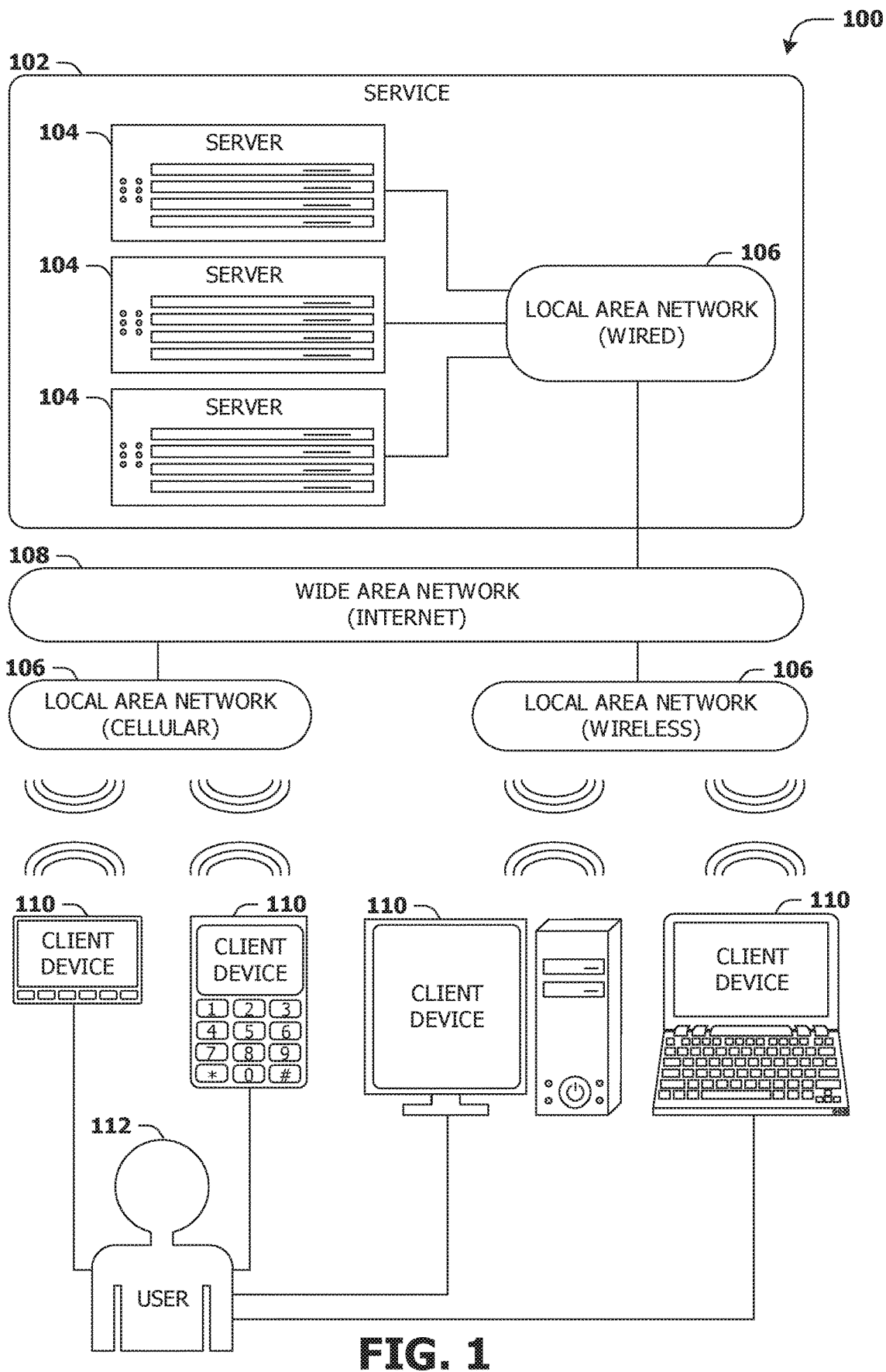
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
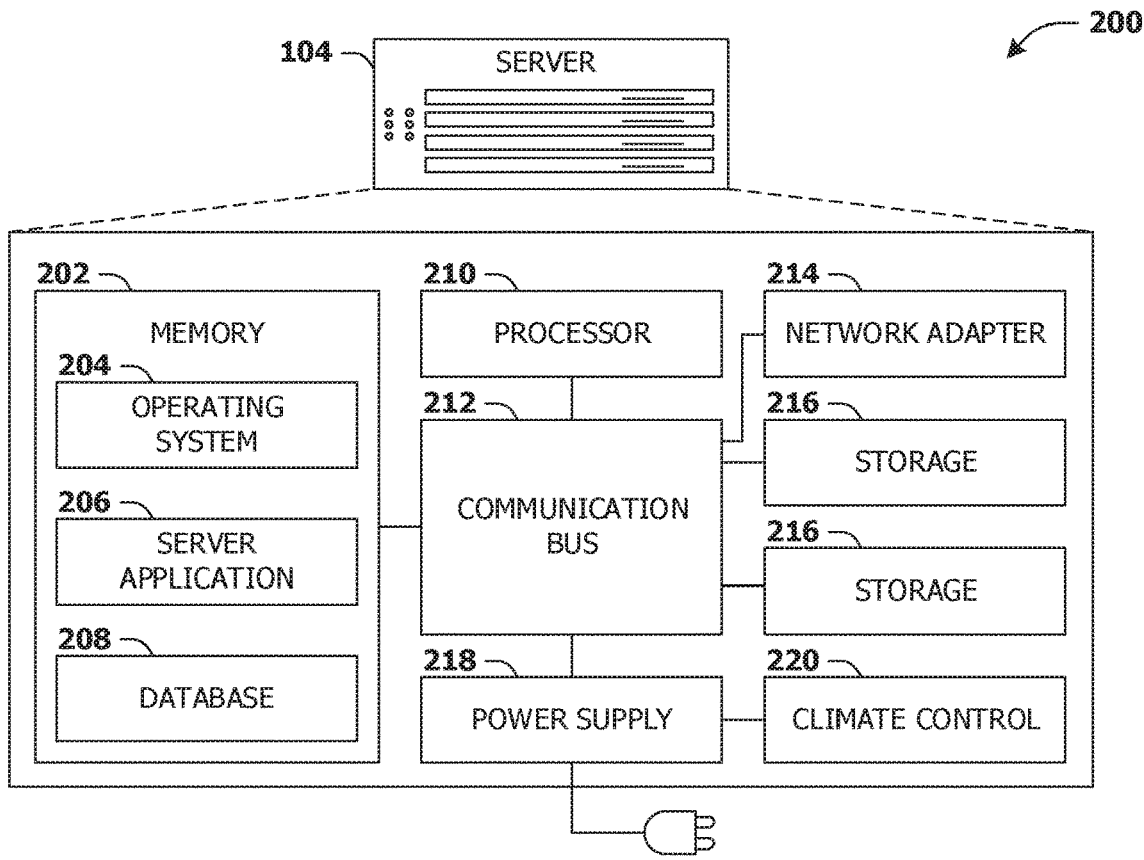
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
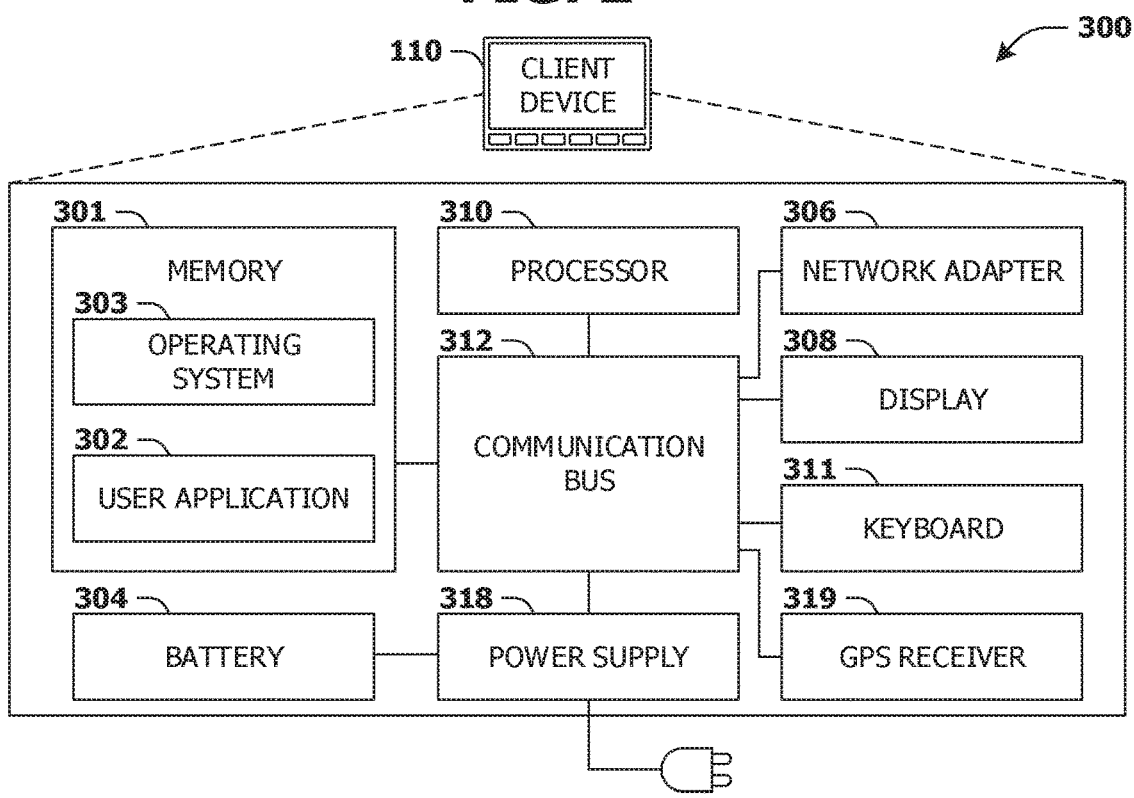
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selecting content for transmission to devices and/or determining measurements are provided. In an example, a content system may present one or more content items via client devices. The one or more content items may be associated with a first entity and/or associated with one or more products, one or more services, etc. associated with the first entity. For example, the one or more content items may be associated with a content campaign (e.g., an advertisement campaign) for promoting the one or more products and/or the one or more services associated with the first entity. Measurements and/or analyses on the content campaign may be used by the first entity to understand at least one of an effectiveness of the content campaign, an impact that the content campaign has on consumers, a measure of conversion events that are performed as a result of the content campaign, etc. Accordingly, the first entity may request that an experiment is performed for determining the measurements and/or analyses.

In order to perform the experiment, a plurality of client devices may be split into a first set of client devices (e.g., a test group) and a second set of client devices (e.g., a control group). A first content item associated with the content campaign may be transmitted to client devices of the first set of client devices and/or one or more replacement content items (in place of the first content item) may be transmitted to client devices of the second set of client devices. One or more first measurements associated with the first set of client devices and/or second measurements associated with the second set of client devices may be determined. The one or more first measurements may be compared with the one or more second measurements to determine an effectiveness of the first content item and/or an impact of the first content item on consumers. In some systems, campaign bid values associated with selection and/or transmission of the first content item to the first set of client devices may be different than bid values associated with selection and/or transmission of the one or more replacement content items to the second set of client devices. However, a probability that a content item is selected and/or transmitted to a client device may be dependent on a bid value of the content item. Accordingly, in a system where a replacement content item participates in an auction using a bid value that is different than a campaign bid value associated with the first content item, a first probability that the replacement content item wins the auction and is transmitted to the client device is different than a second probability of the first content item winning the auction and being transmitted to the client device, had the first content item participated in the auction. Thus, in the system, the one or more replacement content items may be transmitted to client devices that have different characteristics than client devices that the first content item is transmitted to, and thus comparison of the one or more first measurements with the one or more second measurements may lead to incorrect conclusions and/or assumptions. For example, the one or more first measurements may be incompatible with the one or more second measurements due to the difference in bid values between bid values used for the one or more replacement content items and bid values used for the first content item.

Thus, in accordance with one or more of the techniques presented herein, a first content item associated with a content campaign may be transmitted to a first set of client devices (e.g., client devices of a first group, such as a test group). A first request for content associated with a first client device may be received. The first client device may be associated with a second group, such as a control group. A first plurality of bid values associated with a first plurality of content items may be determined. The first plurality of content items may not comprise the first content item associated with the content campaign (e.g., the first content item may not be included in the first plurality of content items based upon the first client device being associated with the second group). Determining the first plurality of bid values may comprise selecting a first bid value associated with a second content item (e.g., a replacement content item). Determining the first plurality of bid values may comprise modifying, based upon a second bid value associated with the first content item, the first bid value to generate a third bid value associated with the second content item. The first plurality of bid values may comprise the third bid value. The third bid value associated with the second content item may be equal to the second bid value associated with the first content item. Accordingly, a probability that the second content item is selected for transmission to the first client device may be similar to (and/or the same as) a probability that the first content item would be selected for transmission to the first client device had the first content item been included in the first plurality of content items. The second content item may be selected from the first plurality of content items for presentation via the first client device based upon the first plurality of bid values. One or more first content items (e.g., one or more replacement content items) may be transmitted to a second set of client devices (e.g., client devices of the second group). Transmitting the one or more first content items to the second set of client devices may comprise transmitting the second content item to the first client device based upon the selection of the second content item for presentation via the first client device. Each transmission of a content item of the transmission of the one or more first content items may be performed by modifying a bid value associated with the content item to generate a modified bid value and/or selecting the content item based upon the modified bid value (e.g., the modified bid value may be generated based upon a bid value associated with the first content item).

Figure 4:
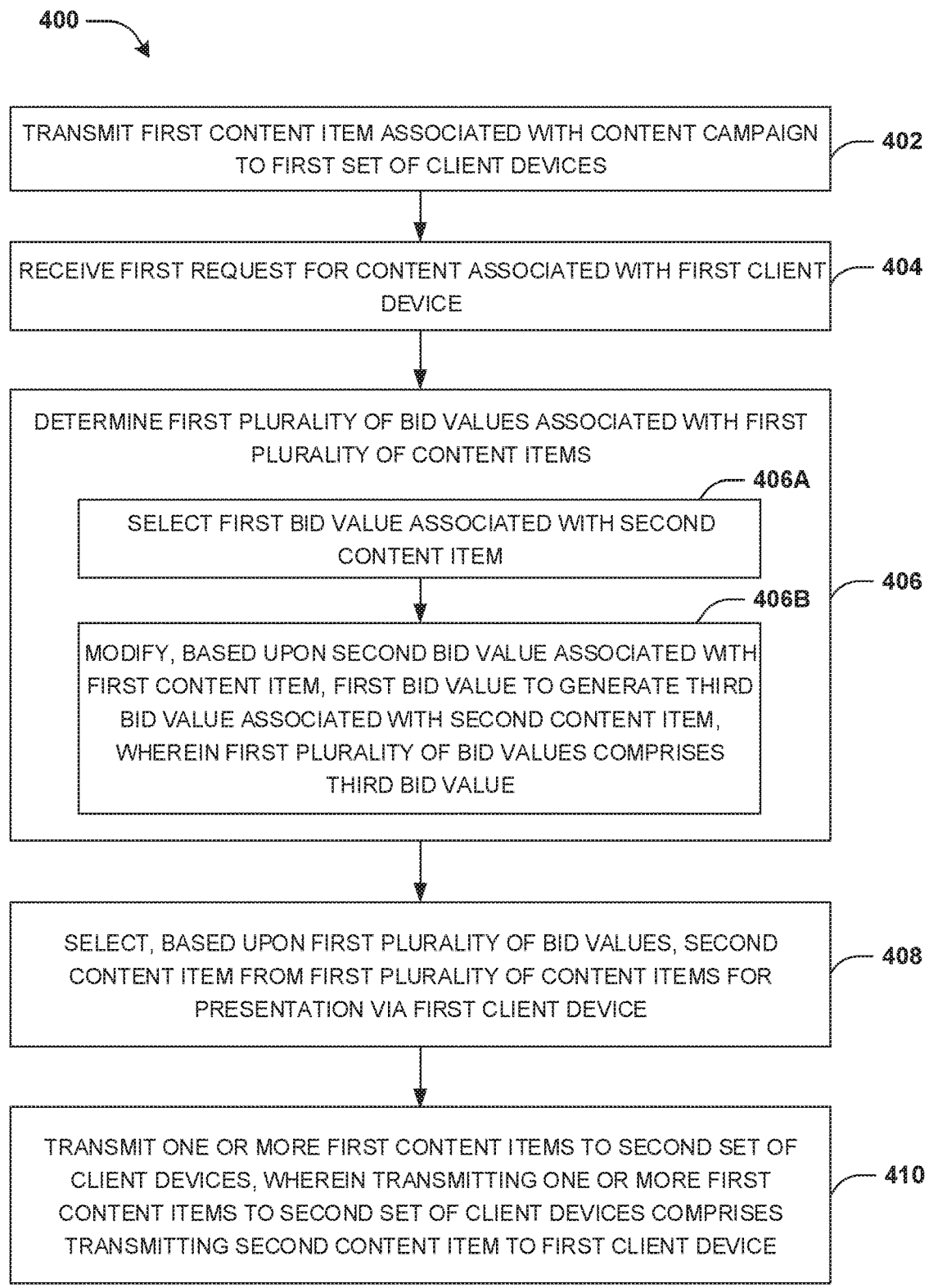
FIG. 4 is a flow chart illustrating an example method for selecting content for transmission to devices and/or determining measurements.

An embodiment of selecting content for transmission to devices and/or determining measurements is illustrated by an example method 400 of FIG. 4. A content system for presenting content via client devices may be provided. In some examples, the content system may be an advertisement system (e.g., an online advertising system). Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, a first entity may access and/or interact with a service, such as an advertising service, that provides a platform for uploading, to the content system, content to be presented via client devices. In some examples, the first entity may be an advertiser, a company, a brand, an organization, etc. One or more content items (e.g., one or more advertisements) associated with the first entity may be received from a device associated with the first entity. The one or more content items may be associated with one or more products, one or more services, etc. associated with the first entity. For example, the first entity may upload, to the content system, the one or more content items. The one or more content items may be associated with a content campaign for promoting the one or more products and/or the one or more services associated with the first entity. Alternatively and/or additionally, content information associated with the content campaign may be received from the device associated with the entity. For example, the content information may comprise one or more of a first budget associated with the content campaign, a first target spend pattern associated with the content campaign, a duration of time for which the one or more content items shall be presented by the content system, one or more campaign goals associated with the content campaign and/or the one or more content items (e.g., a number of impressions associated with the one or more content items, a number of interactions associated with the one or more content items, a number of conversion events performed as a result of the content campaign, etc.), etc.

In some examples, a first content item associated with the content campaign may be presented via client devices associated with the content system. The first entity may request that an experiment is performed for determining measurements and/or analyses on the content campaign associated with at least one of an effectiveness of the content campaign and/or the first content item, an impact that the content campaign and/or the first content item has on consumers, a measure of conversion events that are performed as a result of presenting the first content item via client devices, a measure of revenue received as a result of the presenting the first content item via client devices, etc.

In some examples, a plurality of identifiers associated with a plurality of client devices may be identified and/or determined. In some examples, an identifier of the plurality of identifiers may correspond to identification information associated with a client device of the plurality of client devices, such as an IP address, a network identification address associated with a network that the client device is connected to and/or a different type of identification. Alternatively and/or additionally, an identifier of the plurality of identifiers may correspond to identification information associated with a user profile and/or a user account corresponding to a client device of the plurality of client devices, such as at least one of a username, a user account identification, etc.

In some examples, the content system may generate and/or maintain a user profile database comprising a plurality of user profiles associated with the plurality of client devices and/or a plurality of user accounts (e.g., email accounts, messaging accounts, content platform accounts for uploading content and/or for consuming articles, videos and/or music, etc.) associated with the content system. A user profile of the plurality of user profiles may comprise an identifier associated with the user profile, a client device associated with the user profile and/or a user account associated with the user profile. Alternatively and/or additionally, a user profile of the plurality of user profiles may comprise demographic information, such as an age (and/or age range), family size, gender, occupation, income, and/or other demographic information. Alternatively and/or additionally, a user profile of the plurality of user profiles may comprise activity information associated with a client device and/or a user account. For example, the activity information may be indicative of at least one of one or more consumed content items (e.g., an article, a video, an audio file, an image, a webpage, an advertisement, an email, a message, etc. consumed by a user), one or more accessed content items (e.g., an article, a video, an audio file, an image, a webpage, an advertisement, an email, a message, etc. accessed by a client device), one or more selected content items (e.g., an article, a video, an audio file, an image, a webpage, an advertisement, an email, a message, etc. selected via a client device), one or more content item interactions (e.g., an advertisement impression, an advertisement click, a conversion associated with an advertisement, etc.), etc.

In some examples, a first set of client devices of the plurality of client devices and/or a first set of user accounts of the plurality of user accounts may be assigned to a first group (e.g., a test group). For example, the first set of client devices and/or the first set of user accounts may be assigned to the first group by assigning a first set of identifiers, associated with the first set of client devices and/or the first set of user accounts, to the first group. In an example, a first identifier data structure (e.g., at least one of a first list of identifiers, a first array comprising identifiers, etc.) may be generated based upon the first group. For example, the first identifier data structure may comprise the first set of identifiers. Alternatively and/or additionally, indications of the second group may be stored in a first set of user profiles associated with the first set of client devices and/or the first set of user accounts.

In some examples, a second set of client devices of the plurality of client devices and/or a second set of user accounts of the plurality of user accounts may be assigned to a second group (e.g., a control group). The first set of client devices may be different than and/or separate from the second set of client devices. Alternatively and/or additionally, the first set of user accounts may be different than and/or separate from the first set of user accounts. The second set of client devices and/or the second set of user accounts may be assigned to the second group by assigning a second set of identifiers, associated with the second set of client devices and/or the second set of user accounts, to the second group. In an example, a second identifier data structure (e.g., at least one of a second list of identifiers, a second array comprising identifiers, etc.) may be generated based upon the second group. For example, the second identifier data structure may comprise the second set of identifiers. Alternatively and/or additionally, indications of the second group may be stored in a second set of user profiles associated with the second set of client devices and/or the second set of user accounts.

In some examples, during the experiment, the first content item may be presented via client devices of the first group and/or the first content item may not be presented via client devices of the second group. For example, during the experiment, rather than presenting the first content item to client devices of the second group, one or more replacement content items may be presented via client devices of the second group.

In some examples, the first set of client devices may be assigned to the first group and/or the second set of client devices may be assigned to the second group randomly. Alternatively and/or additionally, the first set of client devices may not be randomly assigned to the first group and/or the second set of client devices may not be randomly assigned to the second group.

In some examples, the first set of client devices may correspond to a first proportion of the plurality of client devices associated with the content system (and/or the first set of user accounts may correspond to the first proportion of the plurality of user accounts). In some examples, the second set of client devices may correspond to a second proportion of the plurality of client devices associated with the content system (and/or the second set of user accounts may correspond to the second proportion of the plurality of user accounts).

In some examples, the first proportion, the second proportion, a quantity of client devices of the first set of client devices, a quantity of user accounts of the first set of user accounts, a quantity of client devices of the second set of client devices and/or a quantity of user accounts of the second set of user accounts may be based upon experiment information. In some examples, the experiment information may be retrieved from an experiment database associated with the content system. Alternatively and/or additionally, the experiment information may be received from a device associated with the first entity. In some examples, the experiment information may be indicative of the first proportion, the second proportion, the quantity of client devices of the first set of client devices, the quantity of user accounts of the first set of user accounts, the quantity of client devices of the second set of client devices and/or the quantity of user accounts of the second set of user accounts. In an example, the first proportion may correspond to between 75% and 95% (and/or a different proportion) and/or the second proportion may correspond to between 5% and 25% (and/or a different proportion). In an example, the first set of client devices may correspond to about 90% of the plurality of client devices and/or the second set of client devices may correspond to about 10% of the plurality of client devices.

At 402, the first content item associated with the content campaign may be transmitted to a third set of client devices. In some examples, the first content item may be transmitted to the third set of client devices based upon a determination that the third set of client devices are associated with the first group (e.g., a determination that the third set of client devices correspond to client devices of the first set of client devices).

In some examples, the third set of client devices may comprise a first client device. A first request for content associated with the first client device may be received. In some examples, the first request for content may be received responsive to the first client device accessing a first internet resource associated with the content system (e.g., one or more of a web page of a website associated with the content system, an application associated with the content system, an internet game associated with the content system, etc.). For example, the first client device may transmit a request to access the first internet resource to a first server associated with the first internet resource. Responsive to receiving the request to access the first internet resource, the first server associated with the first internet resource may transmit the first request for content to the content system (and/or to a second server associated with the content system). Alternatively and/or additionally, the first request for content may be received from the first client device. In some examples, the first request for content may correspond to a request to be provided with a content item (e.g., an advertisement, an image, a link, a video, etc.) for presentation via the first internet resource.

In some examples, responsive to receiving the first request for content, a bidding process may be performed to select a content item from a first plurality of content items participating in an auction (e.g., an auction for selection of a content item to present via the first client device). In some examples, the first plurality of content items (participating in the auction) may comprise the first content item. For example, the first content item may be included in the first plurality of content items based upon a determination that the first client device is associated with the first group.

In some examples, it may be determined that the first client device is associated with the first group based upon a first identifier associated with the first client device. The first identifier may be determined based upon the first request for content. For example, the first request for content may be indicative of the first identifier associated with the first client device. The first request for content may be analyzed to determine the first identifier. In some examples, the first identifier data structure may be analyzed to determine whether the first identifier data structure comprises the first identifier. It may be determined that the first client device is associated with the first group based upon a determination that the first identifier data structure comprises the first identifier.

Alternatively and/or additionally, it may be determined that the first client device is associated with the first group based upon a first user profile associated with the first client device. For example, the first user profile may be identified based upon the first identifier (e.g., the first user profile may be indicative of the first identifier associated with the first client device). In some examples, the first user profile may be analyzed to determine whether the first client device is associated with the first group. It may be determined that the first client device is associated with the first group based upon a determination that the first user profile comprises an indication of the first group.

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise a first bid value associated with the first content item.

In some examples, the first content item may be selected from the first plurality of content items for presentation via the first client device based upon the first plurality of bid values. For example, the first content item may be selected from the first plurality of content items based upon a determination that the first bid value associated with the first content item exceeds a threshold bid value. Alternatively and/or additionally, the first content item may be selected from the first plurality of content items based upon a determination that the first bid value is a highest bid value of the first plurality of bid values.

Alternatively and/or additionally, a first plurality of content item scores may be determined. For example, the first plurality of content items scores may be determined based upon the first plurality of bid values and/or a first plurality of click probabilities. The first plurality of click probabilities may be determined based upon content information associated with the first plurality of content items and/or the first user profile associated with the first client device. In some examples, a click probability of the first plurality of click probabilities may correspond to a probability of receiving a selection of a content item responsive to presenting the content item via the first client device. Alternatively and/or additionally, a click probability of the first click probabilities may correspond to a probability of receiving a positive signal responsive to presenting a content item via the first client device. For example, the positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first client device.

In some examples, the first content item may be selected from the first plurality of content items for presentation via the first client device based upon the first plurality of content item scores. For example, the first content item may be selected from the first plurality of content items based upon a determination that a first content item score associated with the first content item exceeds a threshold content item score. Alternatively and/or additionally, the first content item may be selected from the first plurality of content items based upon a determination that the first content item score is a highest content item score of the first plurality of content item scores. Alternatively and/or additionally, the first content item may be selected from the first plurality of content items for presentation via the first client device based upon the first plurality of bid values (and/or not based upon the first plurality of content item scores).

In some examples, the first content item may be transmitted to the first client device responsive to selecting the first content item for presentation via the first client device. The first content item may be presented via the first client device. For example, the first content item may be presented via the first internet resource on the first client device, such as while the first internet resource is accessed and/or displayed.

In some examples, a first impression indicator may be generated and/or stored responsive to selecting the first content item for presentation via the first client device, transmitting the first content item to the first client device and/or presenting the first content item via the first client device. In some examples, the first impression indicator may be indicative of selection of the first content item for presentation via the first client device. Alternatively and/or additionally, the first impression indicator may be indicative of transmission of the first content item to the first client device. Alternatively and/or additionally, the first impression indicator may be indicative of presentation of the first content item via the first client device. For example, the first impression indicator may comprise at least one of the first identifier associated with the first client device, an indication of the first content item, a time that the first content item is transmitted to the first client device, a time that the first content item is presented via the first client device, etc.

In some examples, a first set of impression indicators (comprising the first impression indicator) associated with the third set of client devices may be stored. In some examples, an impression indicator of the first set of impression indicators may be indicative of selection of the first content item for presentation via a client device of the third set of client devices, transmission of the first content item to a client device of the third set of client devices and/or presentation of the first content item via a client device of the third set of client devices. In some examples, the first set of impression indicators may be stored in a first impression indicator data structure associated with the first group. For example, responsive to the first content item being transmitted to a client device of the third set of client devices and/or being presented via the client device, an impression indicator of the first set of impression indicators may be stored in the first impression data structure. Alternatively and/or additionally, an impression indicator of the first set of impression indicators may be stored in a user profile associated with the impression indicator. In some examples, the first set of impression indicators may be used to determine (and/or keep track of) client devices that received and/or presented the first content item.

At 404, a second request for content associated with a second client device may be received. In some examples, the second request for content may be received responsive to the second client device accessing a second internet resource associated with the content system. For example, the second client device may transmit a request to access the second internet resource to a third server associated with the second internet resource. Responsive to receiving the request to access the second internet resource, the third server associated with the second internet resource may transmit the second request for content to the content system (and/or to the second server associated with the content system). Alternatively and/or additionally, the second request for content may be received from the second client device. In some examples, the second request for content may correspond to a request to be provided with a content item (e.g., an advertisement, an image, a link, a video, etc.) for presentation via the second internet resource.

In some examples, responsive to receiving the second request for content, a bidding process may be performed to select a content item from a second plurality of content items participating in an auction (e.g., an auction for selection of a content item to present via the second client device). In some examples, the second plurality of content items (participating in the auction) may not comprise the first content item. For example, the first content item may not be included in the second plurality of content items based upon a determination that the second client device is associated with the second group. Alternatively and/or additionally, the first content item may be removed from the second plurality of content items based upon a determination that the second client device is associated with the second group.

In some examples, it may be determined that the second client device is associated with the second group based upon a second identifier associated with the second client device. The second identifier may be determined based upon the second request for content. For example, the second request for content may be indicative of the second identifier associated with the second client device. The second request for content may be analyzed to determine the second identifier. In some examples, the second identifier data structure may be analyzed to determine whether the second identifier data structure comprises the second identifier. It may be determined that the second client device is associated with the second group based upon a determination that the second identifier data structure comprises the second identifier.

Alternatively and/or additionally, it may be determined that the second client device is associated with the second group based upon a second user profile associated with the second client device. For example, the second user profile may be identified based upon the second identifier (e.g., the second user profile may be indicative of the second identifier associated with the second client device). In some examples, the second user profile may be analyzed to determine whether the second client device is associated with the second group. It may be determined that the second client device is associated with the second group based upon a determination that the second user profile comprises group information indicative of the second group.

At 406, a second plurality of bid values associated with the second plurality of content items may be determined. In some examples, the second plurality of bid values may be determined by performing acts 406A and 406B. At 406A, a second bid value associated with a second content item of the second plurality of content items may be selected. At 406B, the second bid value may be modified, based upon a bid value associated with the first content item, to generate a third bid value associated with the second content item. The second plurality of bid values may comprise the third bid value. In some examples, the second bid value may be selected and/or modified responsive to (and/or based upon) the determination that the second client device is associated with the second group. Alternatively and/or additionally, the second content item associated with the second bid value may be selected as a replacement content item (to be selected and/or presented in place of the first content item) responsive to (and/or based upon) the determination that the second client device is associated with the second group. Alternatively and/or additionally, the second content item associated with the second bid value may be selected as a replacement content item responsive to (and/or based upon) the selection of the second bid value.

In an example, prior to determining the second plurality of bid values, a third plurality of bid values associated with the second plurality of content items may be determined. The third plurality of bid values may be determined based upon budgets (e.g., daily budgets) and/or target spend patterns associated with the second plurality of content items. For example, the third plurality of bid values and/or the budgets may be received from devices associated with entities (e.g., advertisers, companies, brands, organizations, etc.) associated with the second plurality of content items. In some examples, the third plurality of bid values may comprise the second bid value associated with the second content item.

The second bid value may be selected from the third plurality of bid values based upon a fourth bid value associated with the first content item. In some examples, the fourth bid value may be the same as the first bid value. Alternatively and/or additionally, the fourth bid value may be different than the first bid value. In some examples, the fourth bid value may be determined based upon the first budget and/or the first target spend pattern associated with the content campaign and/or the first content item. Alternatively and/or additionally, the fourth bid value may be determined based upon a target spend value corresponding to a target amount to spend within a period of time within which the second request for content is received. Alternatively and/or additionally, the fourth bid value may be determined based upon a budget factor value associated with the period of time. In some examples, the fourth bid value may be determined responsive to receiving the second request for content.

In some examples, the second bid value may be selected from the third plurality of bid values (and/or the second content item associated with the second bid value may be selected as a replacement content item) based upon a determination that the second bid value is less than the fourth bid value. Alternatively and/or additionally, the second bid value may be selected from the third plurality of bid values (and/or the second content item associated with the second bid value may be selected as a replacement content item) based upon a determination that the second bid value is less than the fourth bid value and/or that no other bid value of the third plurality of bid values is between the second bid value and the fourth bid value. In an example where the second bid value is 3.7 and the fourth bid value is 4, the second bid value may be selected based upon a determination that a different bid value is not between 3.7 and 4). For example, one or more first bid values, less than the fourth bid value, of the third plurality of bid values may be determined. The one or more first bid values may comprise the second bid value. In some examples, the second bid value may be selected from the third plurality of bid values (and/or the second content item may be selected as a replacement content item) based upon a determination that the second bid value is a highest bid value of the one or more first bid values. Alternatively and/or additionally, the second bid value may be selected from the third plurality of bid values (and/or the second content item associated with the second bid value may be selected as a replacement content item) based upon a determination that the second bid value is equal to the fourth bid value. Alternatively and/or additionally, the second bid value may be greater than the fourth bid value.

In some examples, the second bid value may be modified to generate the third bid value by increasing the second bid value to generate the third bid value. In some examples, the second bid value may be modified to generate the third bid value equal to fourth bid value. For example, the second bid value may be increased by a difference between the second bid value and the fourth bid value. In an example where the second bid value is 3.7 and the fourth bid value is 4, the second bid value may be increased by 0.3. Alternatively and/or additionally, in an example where the second bid value is equal to the fourth bid value, the third bid value may be equal to the second bid value (and/or the second bid value may not be modified). Alternatively and/or additionally, the second bid value may be modified to generate the third bid value not equal to the fourth bid value. For example, the second bid value may be less than or greater than the fourth bid value. Alternatively and/or additionally, the second bid value may be decreased to generate the third bid value. For example, the second bid value may be decreased by a difference between the second bid value and the fourth bid value to generate the third bid value equal to the fourth bid value (e.g., the second bid value may be greater than the fourth bid value).

In some examples, the second plurality of bid values may comprise bid values of the third plurality of bid values other than the second bid value associated with the second content item. For example, the second plurality of bid values may comprise the third bid value associated with the second content item rather than the second bid value associated with the second content item.

At 408, the second content item may be selected from the second plurality of content items for presentation via the second client device based upon the second plurality of bid values. For example, the second content item may be selected from the second plurality of content items based upon a determination that the third bid value associated with the second content item exceeds a threshold bid value. Alternatively and/or additionally, the second content item may be selected from the first plurality of content items based upon a determination that the third bid value is a highest bid value of the second plurality of bid values.

Alternatively and/or additionally, a second plurality of content item scores may be determined. For example, the second plurality of content items scores may be determined based upon the second plurality of bid values and/or a second plurality of click probabilities. In some examples, the second content item may be selected from the second plurality of content items for presentation via the second client device based upon the second plurality of content item scores. For example, the second content item may be selected from the second plurality of content items based upon a determination that a second content item score associated with the second content item exceeds a threshold content item score. Alternatively and/or additionally, the second content item may be selected from the second plurality of content items based upon a determination that the second content item score is a highest content item score of the second plurality of content item scores. Alternatively and/or additionally, the second content item may be selected from the second plurality of content items for presentation via the second client device based upon the second plurality of bid values (and/or not based upon the second plurality of content item scores).

In some examples, the second content item may be transmitted to the second client device responsive to selecting the second content item for presentation via the second client device. At 410, one or more first content items (e.g., one or more replacement content items) may be transmitted to a fourth set of client devices. In some examples, the transmission of the one or more first content items of act 410 may comprise the transmission of the second content item to the second client device. For example, the one or more first content items may comprise the second content item and/or the fourth set of client devices may comprise the second client device.

In some examples, the one or more first content items may be transmitted to the fourth set of client devices based upon a determination that the fourth set of client devices are associated with the second group (e.g., a determination that the fourth set of client devices are comprised within the second set of client devices). Alternatively and/or additionally, transmission of a content item of the one or more first content items to a client device of the fourth set of client devices may correspond to transmission of a content item that is selected from a plurality of content items based upon a plurality of bid values, where a bid value associated with the content item is modified based upon a bid value associated with the first content item. Alternatively and/or additionally, a transmission of a content item of the one or more first content items of the transmission of the one or more first content items of act 410 may correspond to transmission of a content item that is selected from a plurality of content items based upon a plurality of bid values, where a bid value associated with the content item is modified based upon a bid value associated with the first content item.

For example, each transmission of a content item of the transmission of the one or more first content items of act 410 may be performed responsive to modifying a bid value associated with the content item based upon a bid value associated with the first content item to generate a modified bid value and/or selecting the content item for presentation via a client device of the fourth set of client devices based upon the modified bid value.

In some examples, the transmission of the one or more first content items to the fourth set of client devices may be controlled based upon a frequency cap value. In an example, a rate at which transmissions of the one or more first content items to client devices are performed (e.g., a quantity of transmissions per unit of time) may be limited by the frequency cap value. For example, responsive to the rate reaching the frequency cap value (e.g., 100 transmissions per minute, 1000 transmissions per hour and/or a different rate), transmission of replacement content items in place of the first content item may be suspended for a suspension period of time. For example, responsive to receiving requests for content from client devices of the second set of client devices during the suspension period of time, bid values associated with content items may not be modified based upon a bid value associated with the first content item.

In some examples, the frequency cap value may be based upon a measure of bid increases associated with the transmission of the one or more first content items to the fourth set of client devices. The measure of bid increases may be determined based upon a plurality of increase amounts associated with a plurality of bid increases. For example, a bid increase of the plurality of bid increases may correspond to increasing a bid value associated with a replacement content item by an increase amount (of the plurality of increase amounts) to generate a modified bid value, where the replacement content item is selected for presentation via a client device of the fourth set of client devices based upon the modified bid value (e.g., after the bid value is increased). In an example, a first bid increase of the plurality of bid increases may correspond to increasing the second bid value by a first increase amount (e.g., the difference between the second bid value and the fourth bid value) to generate the third bid value, where the second content item associated with the second bid value is selected for presentation via the second client device after the second bid value is increased.

In some examples, the measure of bid increases may be determined based upon the plurality of increase amounts. For example, one or more operations (e.g., mathematical operations) may be performed using the plurality of increase amounts to determine the measure of bid increases. In some examples, the measure of bid increases may correspond to a total increase amount of the plurality of increase amounts. Alternatively and/or additionally, the measure of bid increases may correspond to a total increase amount of one or more bid increases of the plurality of bid increases that occurred within a period of time (e.g., a day, an hour, etc.). In some examples, responsive to a determination that the measure of bid increases exceeds a first threshold measure of bid increases, the frequency cap value may be decreased. Alternatively and/or additionally, responsive to a determination that the measure of bid increases is less than a second threshold measure of bid increases, the frequency cap value may be increased.

In some examples, responsive to transmission of the second content item to the second client device, the second content item may be presented via the second client device. For example, the second content item may be presented via the second internet resource on the second client device, such as while the second internet resource is accessed and/or displayed.

In some examples, a first ghost impression indicator may be generated and/or stored responsive to selecting the second content item for presentation via the second client device, transmitting the second content item to the second client device and/or presenting the second content item via the second client device. In some examples, the first ghost impression indicator may be indicative of selection of the second content item for presentation via the second client device. Alternatively and/or additionally, the first ghost impression indicator may be indicative of transmission of the second content item to the second client device. Alternatively and/or additionally, the first ghost impression indicator may be indicative of presentation of the second content item via the second client device. In some examples, the first ghost impression indicator may be generated and/or stored responsive to (and/or based upon) a determination that the second client device is associated with the second group and/or a determination that the selection of the second content item for presentation via the second client device was based upon a bid value that was modified based upon a bid value associated with the first content item. For example, the first ghost impression indicator may comprise at least one of the second identifier associated with the second client device, an indication of the first content item, an indication of the second content item, a time that the second content item is transmitted to the second client device, a time that the second content item is presented via the second client device, etc.

In some examples, a first set of ghost impression indicators (comprising the first ghost impression indicator) associated with the fourth set of client devices may be stored. In some examples, an impression indicator of the first set of ghost impression indicators may be indicative of selection of a content item of the one or more first content items for presentation via a client device of the fourth set of client devices, transmission of a content item of the one or more first content items to a client device of the fourth set of client devices and/or presentation of a content item of the one or more first content items via a client device of the fourth set of client devices. In some examples, the first set of ghost impression indicators may be stored in a first ghost impression indicator data structure associated with the second group. For example, responsive to a content item of the one or more first content items being transmitted to a client device of the fourth set of client devices and/or being presented via the client device, a ghost impression indicator of the first set of ghost impression indicators may be stored in the first ghost impression data structure. Alternatively and/or additionally, a ghost impression indicator of the first set of ghost impression indicators may be stored in the first ghost impression data structure responsive to (and/or based upon) a content item of the one or more first content items being selected for presentation via a client device of the fourth set of client devices, where the selection is based upon a modified bid value associated with the content item that is generated based upon a bid value associated with the first content item. Alternatively and/or additionally, a ghost impression indicator of the first set of ghost impression indicators may be stored in a user profile associated with the ghost impression indicator. In some examples, the first set of ghost impression indicators may be used to determine (and/or keep track of) client devices that received and/or presented a replacement content item (e.g., a content item that is selected for presentation based upon one bid value that is generated based upon a bid value associated with the first content item). For example, the first set of impression indicators may be used to determine (and/or keep track of) instances where client devices of the second group would have received and/or presented the first content item if the first content item was included in auctions and/or bidding processes associated with the second group.

In some examples, first conversion information associated with the third set of client devices (that received the first content item) may be determined. First activity associated with the third set of client devices may be analyzed to determine the first conversion information. In some examples, the third set of client devices and/or the first activity associated with the third set of client devices may be identified based upon the first set of impression indicators. The first conversion information may comprise a first conversion rate associated with the first entity, a first quantity of conversion events associated with the first entity, a first revenue associated with the first entity, etc.

In some examples, a first set of conversion events associated with the first entity may be determined by analyzing the first activity associated with the third set of client devices. In some examples, a conversion event of the first set of conversion events may correspond to one or more of a purchase of a product of one or more products associated with the first entity, a purchase of a service of one or more services associated with the first entity, subscribing to (and/or signing up for) a service of one or more services associated with the first entity, contacting the first entity (e.g., contacting the first entity via one or more of email, phone, etc.), a selection of a content item associated with the first entity, an interaction with a content item of associated with the first entity (such as the first content item), accessing a webpage associated with the first entity, etc.

In some examples, conversion identification information may be retrieved from a database and/or may be received from the device associated with the first entity. The conversion identification information may be indicative of one or more actions that constitute an occurrence of a conversion event (with respect to the first entity and/or the advertisement campaign). For example, conversion identification information may indicative of a set of actions, wherein an action of the set of actions constitute a conversion event (e.g., the set of actions may comprise one or more of a purchase of a product of the one or more products associated with the first entity, a purchase of a service of the one or more services associated with the first entity, subscribing to (and/or signing up for) a service of the one or more services associated with the first entity, contacting the first entity (e.g., contacting the first entity via one or more of email, phone, etc.), a selection of a content item associated with the first entity, an interaction with a content item associated with the first entity, accessing a webpage associated with the first entity, etc.).

In some examples, the first activity associated with the third set of client devices may be analyzed based upon the conversion identification information to determine the first set of conversion events. For example, a conversion event of the first set of conversion events may be identified and/or determined by detecting a selection of a content item associated with the first entity using a client device of the third set of client devices. Alternatively and/or additionally, a conversion event of the first set of conversion events may be identified and/or determined by detecting an interaction with a content item associated with the first entity using a client device of the third set of client devices. Alternatively and/or additionally, a conversion event of the first set of conversion events may be identified and/or determined by detecting a webpage associated with the first entity being accessed using a client device of the third set of client devices. Alternatively and/or additionally, a conversion event of the first set of conversion events may be identified and/or determined by detecting a purchase of a product and/or a service associated with the first entity using a client device of the third set of client devices. Alternatively and/or additionally, a conversion event of the first set of conversion events may be identified and/or determined by detecting a subscription to a service associated with the first entity using a client device of the third set of client devices.

Alternatively and/or additionally, a third set of user profiles associated with the third set of client devices may be analyzed to determine the first set of conversion events. For example, the third set of user profiles may be indicative of the first activity associated with the third set of client devices. The third set of user profiles may be analyzed based upon the conversion identification information to determine the first set of conversion events. For example, a conversion event of the first set of conversion events may be identified and/or determined by identifying, within a user profile of the third set of user profiles, an indication of a selection of a content item associated with the first entity. Alternatively and/or additionally, a conversion event of the first set of conversion events may be identified and/or determined by identifying, within a user profile of the third set of user profiles, an indication of an interaction with a content item associated with the first entity. Alternatively and/or additionally, a conversion event of the first set of conversion events may be identified and/or determined by identifying, within a user profile of the third set of user profiles, an indication a webpage associated with the first entity being accessed. Alternatively and/or additionally, a conversion event of the first set of conversion events may be identified and/or determined by identifying, within a user profile of the third set of user profiles, an indication a purchase of a product and/or a service associated with the first entity. Alternatively and/or additionally, a conversion event of the first set of conversion events may be identified and/or determined by identifying, within a user profile of the third set of user profiles, an indication of a subscription to a service associated with the first entity.

Alternatively and/or additionally, messages (e.g., at least one of instant messages, emails, etc.) associated with the third set of client devices may be analyzed to identify one or more exemplary messages indicative of one or more of a purchase of a product associated with the first entity (e.g., a receipt, a proof of purchase, a confirmation email, etc.), a purchase of a service associated with the first entity (e.g., a receipt, a proof of purchase, a confirmation email, etc.), a subscription to a service associated with the first entity, a confirmation a client device and/or a user contacted the first entity and/or signed up for a service associated with the first entity, etc. For example, a conversion event may be determined based upon the one or more exemplary messages.

Alternatively and/or additionally, conversion information may be received from a device associated with the first entity. The conversion information may be indicative of client devices of the third set of client devices associated with conversion events. The first set of conversion events may be determined based upon the conversion information.

In some examples, the first set of conversion events may correspond to conversion events performed after transmission of the first content item to the third set of client devices. For example, a conversion event of the first set of conversion events may be performed via a client device of the third set of client devices after the first content item is transmitted to the client device and/or presented via the client device. Alternatively and/or additionally, the first activity (that is analyzed to determine the first set of conversion events) may correspond to activity of the third set of client devices performed after transmission of the first content item. For example, for each client device of the third set of client devices, activity may be analyzed that occurred after the first content item is transmitted to the client device and/or presented via the client device. In an example, a first exemplary client device of the third set of client devices may receive the first content item at a first exemplary time. The first activity that is analyzed to determine the first set of conversion events may comprise activity associated with the first exemplary client device that occurred after the first exemplary time. A second exemplary client device of the third set of client devices may receive the first content item at a second exemplary time. The first activity that is analyzed to determine the first set of conversion events may comprise activity associated with the second exemplary client device that occurred after the second exemplary time.

Embodiments are contemplated where the first activity (that is analyzed to determine the first set of conversion events) comprises activity of the third set of client devices performed before the first content item is transmitted to the third set of client devices. For example, a conversion event of the first set of conversion events may be performed via a client device of the third set of client devices before the first content item is transmitted to the client device and/or presented via the client device.

In some examples, the first quantity of conversion events of the first conversion information may be determined based upon the first set of conversion events. For example, the first quantity of conversion events may correspond to a quantity of the first set of conversion events.

In some examples, the first conversion rate of the first conversion information may be determined based upon the first set of conversion events. The first conversion rate may correspond to a proportion of client devices of the third set of client devices that performed a conversion event associated with the first entity (e.g., the first conversion rate may be indicate that 30% of the third set of client devices performed a conversion event associated with the first entity). Alternatively and/or additionally, the first conversion rate may correspond to a proportion of client devices of the third set of client devices that performed a conversion event associated with the first entity after receiving and/or presenting the first content item (e.g., the first conversion rate may indicate that 30% of the third set of client devices performed a conversion event associated with the first entity after receiving and/or presenting the first content item).

In some examples, the first revenue of the first conversion information may be determined based upon the first set of conversion events and/or the first activity of the third set of client devices. The first revenue may correspond to an amount of revenue and/or a predicted amount of revenue associated with the third set of client devices. For example, the first revenue may correspond to an amount of revenue received (by the first entity, for example) as a result of transmitting the first content item to the third set of client devices and/or presenting the first content item via the third set of client devices. In some examples, the first set of conversion events may be analyzed to determine purchases of the first set of conversion events. The first revenue may be determined based upon the purchases. Alternatively and/or additionally, the first set of conversion events may be analyzed to identify one or more conversion events that are indicative of a high probability of a future purchase associated with the first entity. For example, a conversion event of the one or more conversion events may be associated with a client device performing an activity, such as visiting a web page associated with the first entity, that may not directly result in revenue for the first entity, but rather may indicate that a probability that a future purchase will be performed via the client device is higher than a threshold probability. The first revenue may be determined (and/or predicted) based upon the one or more conversion events. Alternatively and/or additionally, the first revenue may correspond to an average revenue. For example, the first revenue may be determined by performing one or more operations (e.g., one or more mathematical operations) using a total revenue (and/or a total predicted revenue) and/or a quantity of client devices of the third set of client devices. In an example where a total revenue (and/or a total predicted revenue) is $3,000 and/or the quantity of client devices of the third set of client devices is 1000 client devices, the first revenue may correspond to $3 per client device of the third set of client devices.

In some examples, second conversion information associated with the fourth set of client devices may be determined. Second activity associated with the fourth set of client devices may be analyzed to determine the second conversion information. In some examples, the fourth set of client devices and/or the second activity associated with the fourth set of client devices may be identified based upon the first set of ghost impression indicators. The second conversion information may comprise a second conversion rate associated with the first entity, a second quantity of conversion events associated with the first entity, a second revenue associated with the first entity, etc.

In some examples, a second set of conversion events associated with the first entity may be determined by analyzing the second activity associated with the fourth set of client devices. In some examples, a conversion event of the second set of conversion events may correspond to one or more of a purchase of a product of one or more products associated with the first entity, a purchase of a service of one or more services associated with the first entity, subscribing to (and/or signing up for) a service of one or more services associated with the first entity, contacting the first entity (e.g., contacting the first entity via one or more of email, phone, etc.), a selection of a content item associated with the first entity, an interaction with a content item of associated with the first entity, accessing a webpage associated with the first entity, etc.

In some examples, the second set of conversion events may correspond to conversion events performed after transmission of the one or more first content items to the fourth set of client devices. For example, a conversion event of the second set of conversion events may be performed via a client device of the fourth set of client devices after a content item (e.g., a replacement content item) of the one or more first content items is transmitted to the client device and/or presented via the client device. Alternatively and/or additionally, the second activity (that is analyzed to determine the second set of conversion events) may correspond to activity of the fourth set of client devices performed after the transmission of the one or more first content items. For example, for each client device of the fourth set of client devices, activity may be analyzed that occurred after a content item (e.g., a replacement content item) of the one or more first content items is transmitted to the client device and/or presented via the client device. In an example, a first exemplary client device of the fourth set of client devices may receive a content item (e.g., a replacement content item) of the one or more first content items at a first exemplary time. The second activity that is analyzed to determine the second set of conversion events may comprise activity associated with the first exemplary client device that occurred after the first exemplary time. A second exemplary client device of the fourth set of client devices may receive a content item (e.g., a replacement content item) of the one or more first content items at a second exemplary time. The second activity that is analyzed to determine the second set of conversion events may comprise activity associated with the second exemplary client device that occurred after the second exemplary time.

Embodiments are contemplated where the second activity (that is analyzed to determine the second set of conversion events) comprises activity of the fourth set of client devices performed before the one or more first content items are transmitted to the fourth set of client devices. For example, a conversion event of the second set of conversion events may be performed via a client device of the fourth set of client devices before a content item (e.g., a replacement content item) of the one or more first content items is transmitted to the client device and/or presented via the client device.

In some examples, the second quantity of conversion events of the second conversion information may be determined based upon the second set of conversion events. For example, the second quantity of conversion events may correspond to a quantity of the second set of conversion events.

In some examples, the second conversion rate of the second conversion information may be determined based upon the second set of conversion events. The second conversion rate may correspond to a proportion of client devices of the fourth set of client devices that performed a conversion event associated with the first entity (e.g., the second conversion rate may be indicate that 10% of the fourth set of client devices performed a conversion event associated with the first entity). Alternatively and/or additionally, the second conversion rate may correspond to a proportion of client devices of the fourth set of client devices that performed a conversion event associated with the first entity after receiving and/or presenting a content item of the one or more first content items (e.g., the second conversion rate may be indicate that 10% of the fourth set of client devices performed a conversion event associated with the first entity after receiving and/or presenting a content item of the one or more first content items).

In some examples, the second revenue of the second conversion information may be determined based upon the second set of conversion events and/or the second activity of the fourth set of client devices. The second revenue may correspond to an amount of revenue and/or a predicted amount of revenue (received by the first entity, for example) associated with the fourth set of client devices. In some examples, the second set of conversion events may be analyzed to determine purchases of the second set of conversion events. The second revenue may be determined based upon the purchases. Alternatively and/or additionally, the second set of conversion events may be analyzed to identify one or more conversion events that are indicative of a high probability of a future purchase associated with the first entity. The second revenue may be determined (and/or predicted) based upon the one or more conversion events.

Alternatively and/or additionally, the second revenue may correspond to an average revenue. For example, the second revenue may be determined by performing one or more operations (e.g., one or more mathematical operations) using a total revenue (and/or a total predicted revenue) and/or a quantity of client devices of the fourth set of client devices. In an example where a total revenue (and/or a total predicted revenue) is $1,000 and/or the quantity of client devices of the fourth set of client devices is 1000 client devices, the second revenue may correspond to $1 per client device of the fourth set of client devices.

In some examples, a measurement report (e.g., an incrementality report) associated with the content campaign may be generated based upon the first conversion information and/or the second conversion information. In some examples, the measurement report may be transmitted to a third client device associated with the first entity and/or the content campaign.

In some examples, the measurement report may be indicative of the first conversion information and/or the second conversion information. Alternatively and/or additionally, the measurement report may be indicative of at least one of the first conversion rate associated with the first entity, the first quantity of conversion events associated with the first entity, the first revenue associated with the first entity, the second conversion rate associated with the first entity, the second quantity of conversion events associated with the first entity, the second revenue associated with the first entity, etc.

In some examples, a first relationship between the first conversion rate and the second conversion rate may be determined. The first relationship may comprise a difference, a percentage difference and/or a percentage change (and/or a different relationship) between the first conversion rate and the second conversion rate. In an example where the first conversion rate corresponds to 30% of the third set of client devices performing a conversion event associated with the first entity and/or the second conversion rate corresponds to 10% of the fourth set of client devices performing a conversion event associated with the first entity, the first relationship may be indicative of a 20% difference between the first conversion rate and the second conversion rate and/or the first relationship may be indicative of a 200% increase from the second conversion rate to the first conversion rate.

In some examples, a second relationship between the first revenue and the second revenue may be determined. The second relationship may comprise a difference, a percentage difference and/or a percentage change (and/or a different relationship) between the first revenue and the second revenue. In an example where the first revenue corresponds to $3 per client device and/or the second revenue corresponds to $1 per client device, the second relationship may be indicative of a $2 difference between the first revenue and the second revenue and/or the second relationship may be indicative of a 100% increase from the second revenue to the first revenue.

In some examples, the first relationship between the first conversion rate and the second conversion rate and/or the second relationship between the first revenue and the second revenue may be included in the measurement report. It may be appreciated that the first conversion rate, the first quantity of conversion events, the first revenue, the second conversion rate, the second quantity of conversion events, the second revenue, the first relationship and/or the second relationship may be representative of an effectiveness of the first content item and/or the content campaign and/or may be representative of an impact that presentation of the first content item has on driving conversion events. Alternatively and/or additionally, including measurements (such as the first conversion rate, the first quantity of conversion events, the first revenue, the second conversion rate, the second quantity of conversion events, the second revenue, the first relationship and/or the second relationship) in the measurement report may enable the first entity to determine and/or understand the effectiveness of the first content item and/or determine and/or understand the impact that presentation of the first content item has on driving conversion events.

In some examples, a transmission control data structure associated with the first content item and/or the content campaign may be modified based upon the first conversion rate, the first quantity of conversion events, the first revenue, the second conversion rate, the second quantity of conversion events, the second revenue, the first relationship and/or the second relationship. In some examples, transmission of the first content item to client devices may be controlled based upon the transmission control data structure. For example, the first content item may be transmitted to client devices based upon the transmission control data structure. Alternatively and/or additionally, bid values associated with the first content item may be generated based upon the transmission control data structure. Alternatively and/or additionally, client devices may be selected and/or targeted for presentation of the first content item based upon the transmission control data structure. In some examples, the transmission control data structure may comprise the first budget associated with the content campaign, the first target spend pattern associated with the content campaign, an expiration time corresponding to a time that transmission of the first content item to client devices is discontinued and/or a user targeting profile associated with the content campaign.

In some examples, the first conversion rate may be compared with a threshold conversion rate. Responsive to determining that the first conversion rate exceeds the threshold conversion rate, the transmission control data structure may be modified. For example, responsive to determining that the first conversion rate exceeds the threshold conversion rate, the first budget may be increased, the first target spend pattern may be modified and/or the expiration time may be extended (e.g., the expiration time may be extended by a duration of time to a later time). Alternatively and/or additionally, responsive to determining that the first conversion rate exceeds the threshold conversion rate, a rate at which the first content item is transmitted to client devices associated with the content system may be increased. Alternatively and/or additionally, a difference between the first conversion rate and the threshold conversion rate may be determined. For example, responsive to determining that the first conversion rate exceeds the threshold conversion rate, the first budget may be increased by an amount that is based upon the difference, the first target spend pattern may be modified based upon the difference and/or the expiration time may be extended by a duration of time that is based upon the difference. Alternatively and/or additionally, responsive to determining that the first conversion rate exceeds the threshold conversion rate, a rate at which the first content item is transmitted to client devices associated with the content system may be increased by an amount that is based upon the difference.

Alternatively and/or additionally, the first conversion rate may be compared with a second threshold conversion rate. Responsive to determining that the first conversion rate is less than the second threshold conversion rate, the transmission control data structure may be modified. For example, responsive to determining that the first conversion rate is less than the second threshold conversion rate, the first budget may be decreased, the first target spend pattern may be modified and/or the expiration time may be changed to an earlier time. Alternatively and/or additionally, responsive to determining that the first conversion rate is less than the second threshold conversion rate, a rate at which the first content item is transmitted to client devices associated with the content system may be decreased (and/or the first content item may not be transmitted to client devices associated with the content system).

In some examples, the first revenue may be compared with a threshold revenue. Responsive to determining that the first revenue exceeds the threshold revenue, the transmission control data structure may be modified. For example, responsive to determining that the first revenue exceeds the threshold revenue, the first budget may be increased, the first target spend pattern may be modified and/or the expiration time may be extended (e.g., the expiration time may be extended by a duration of time to a later time). Alternatively and/or additionally, responsive to determining that the first revenue exceeds the threshold revenue, a rate at which the first content item is transmitted to client devices associated with the content system may be increased. Alternatively and/or additionally, a difference between the first revenue and the threshold revenue may be determined. For example, responsive to determining that the first revenue exceeds the threshold revenue, the first budget may be increased by an amount that is based upon the difference, the first target spend pattern may be modified based upon the difference and/or the expiration time may be extended by a duration of time that is based upon the difference. Alternatively and/or additionally, responsive to determining that the first revenue exceeds the threshold revenue, a rate at which the first content item is transmitted to client devices associated with the content system may be increased by an amount that is based upon the difference.

Alternatively and/or additionally, the first revenue may be compared with a second threshold revenue. Responsive to determining that the first revenue is less than the second threshold revenue, the transmission control data structure may be modified. For example, responsive to determining that the first revenue is less than the second threshold revenue, the first budget may be decreased, the first target spend pattern may be modified and/or the expiration time may be changed to an earlier time. Alternatively and/or additionally, responsive to determining that the first revenue is less than the second threshold revenue, a rate at which the first content item is transmitted to client devices associated with the content system may be decreased (and/or the first content item may not be transmitted to client devices associated with the content system).

In some examples, the first relationship between the first conversion rate and the second conversion rate may be compared with a first threshold relationship. Responsive to determining that the first conversion rate exceeds the second conversion rate and/or that the first relationship exceeds the first threshold relationship, the transmission control data structure may be modified. For example, responsive to determining that the first conversion rate exceeds the second conversion rate and/or that the first relationship exceeds the first threshold relationship, the first budget may be increased, the first target spend pattern may be modified and/or the expiration time may be extended (e.g., the expiration time may be extended by a duration of time to a later time). Alternatively and/or additionally, responsive to determining that the first conversion rate exceeds the second conversion rate and/or that the first relationship exceeds the first threshold relationship, a rate at which the first content item is transmitted to client devices associated with the content system may be increased. Alternatively and/or additionally, a difference between the first relationship and the first threshold relationship may be determined. For example, responsive to determining that the first conversion rate exceeds the second conversion rate and/or that the first relationship exceeds the first threshold relationship, the first budget may be increased by an amount that is based upon the difference, the first target spend pattern may be modified based upon the difference and/or the expiration time may be extended by a duration of time that is based upon the difference. Alternatively and/or additionally, responsive to determining that the first conversion rate exceeds the second conversion rate and/or that the first relationship exceeds the first threshold relationship, a rate at which the first content item is transmitted to client devices associated with the content system may be increased by an amount that is based upon the difference.

In some examples, the second relationship between the first revenue and the second revenue may be compared with a second threshold relationship. Responsive to determining that the first revenue exceeds the second revenue and/or that the second relationship exceeds the second threshold relationship, the transmission control data structure may be modified. For example, responsive to determining that the first revenue exceeds the second revenue and/or that the second relationship exceeds the second threshold relationship, the first budget may be increased, the first target spend pattern may be modified and/or the expiration time may be extended (e.g., the expiration time may be extended by a duration of time to a later time). Alternatively and/or additionally, responsive to determining that the first revenue exceeds the second revenue and/or that the second relationship exceeds the second threshold relationship, a rate at which the first content item is transmitted to client devices associated with the content system may be increased. Alternatively and/or additionally, a difference between the second relationship and the second threshold relationship may be determined. For example, responsive to determining that the first revenue exceeds the second revenue and/or that the second relationship exceeds the second threshold relationship, the first budget may be increased by an amount that is based upon the difference, the first target spend pattern may be modified based upon the difference and/or the expiration time may be extended by a duration of time that is based upon the difference. Alternatively and/or additionally, responsive to determining that the first revenue exceeds the second revenue and/or that the second relationship exceeds the second threshold relationship, a rate at which the first content item is transmitted to client devices associated with the content system may be increased by an amount that is based upon the difference.

Alternatively and/or additionally, the first relationship may be compared with a third threshold relationship. Responsive to determining that the first relationship is less than the third threshold relationship, the transmission control data structure may be modified. For example, responsive to determining that the first relationship is less than the third threshold relationship, the first budget may be decreased, the first target spend pattern may be modified and/or the expiration time may be changed to an earlier time. Alternatively and/or additionally, responsive to determining that the first relationship is less than the third threshold relationship, a rate at which the first content item is transmitted to client devices associated with the content system may be decreased (and/or the first content item may not be transmitted to client devices associated with the content system).

Alternatively and/or additionally, the second relationship may be compared with a fourth threshold relationship. Responsive to determining that the second relationship is less than the fourth threshold relationship, the transmission control data structure may be modified. For example, responsive to determining that the second relationship is less than the fourth threshold relationship, the first budget may be decreased, the first target spend pattern may be modified and/or the expiration time may be changed to an earlier time. Alternatively and/or additionally, responsive to determining that the second relationship is less than the fourth threshold relationship, a rate at which the first content item is transmitted to client devices associated with the content system may be decreased (and/or the first content item may not be transmitted to client devices associated with the content system).

In some examples, a plurality of sets of measurements may be determined based upon the first activity associated with the third set of client devices and/or the second activity associated with the fourth set of client devices. The plurality of sets of measurements may be associated with a plurality of sets of user characteristics. For example, a set of measurements of the plurality of sets of measurements (and/or each set of measurements of the plurality of sets of measurements) may be associated with a set of user characteristics of the plurality of sets of user characteristics.

In some examples, a first set of user characteristics of the plurality of sets of user characteristics may correspond to a first set of user demographics (e.g., at least one of age range, family size, gender, occupation, income, etc.) and/or a first set of historical activity (e.g., at least one of one or more content items accessed and/or selected, one or more web pages accessed, one or more searches performed, etc.). In some examples, a fifth set of client devices, of the third set of client devices and/or the fourth set of client devices, that are associated with the first set of user characteristics may be determined based upon device activity and/or user profiles. For example, device activity and/or user profiles associated with the third set of client devices and/or the fourth set of client devices may be analyzed based upon the first set of user characteristics to identify the fifth set of client devices that are associated with the first set of user characteristics, such as client devices associated with device activity and/or user profiles that match at least a portion of the first set of user demographics and/or at least a portion of the first set of historical activity.

In some examples, a first set of measurements of the plurality of sets of measurements may be associated with the first set of user characteristics. The first set of measurements may be determined by analyzing activity and/or user profiles associated with the fifth set of client devices. The first set of measurements may comprise a first subset of measurements associated with client devices of the fifth set of client devices that received and/or presented the first content item. Alternatively and/or additionally, the first set of measurements may comprise a second subset of measurements associated with client devices of the fifth set of client devices that received and/or presented a content item (e.g., a replacement content item) of the one or more first content items. In some examples, the first subset of measurements may comprise a third conversion rate associated with the first entity, a third quantity of conversion events associated with the first entity and/or a third revenue associated with the first entity. Alternatively and/or additionally, the second subset of measurements may comprise a fourth conversion rate associated with the first entity, a fourth quantity of conversion events associated with the first entity and/or a fourth revenue associated with the first entity. Alternatively and/or additionally, the first set of measurements may comprise a third relationship between the third conversion rate and the fourth conversion rate and/or a fourth relationship between the third revenue and the fourth revenue.

In some examples, the measurement report may be indicative of the plurality of sets of measurements associated with the plurality of sets user characteristics. It may be appreciated that the plurality of sets of measurements may be representative of an effectiveness of the first content item and/or the content item with respect to each set of user characteristics of the plurality of sets of user characteristics. Alternatively and/or additionally, the plurality of sets of measurements may be representative of an impact that presentation of the first content item has on driving conversion events by users associated with each set of user characteristics of the plurality of sets of user characteristics. For example, the plurality of sets of measurements may be representative of the first content item having a first effectiveness when presented via devices associated with the first set of user characteristics and/or the first content item having a second effectiveness when presented via devices associated with a second set of user characteristics. Alternatively and/or additionally, including the plurality of sets of measurements in the measurement report may enable the first entity to determine and/or understand the effectiveness of the first content item with respect to each set of user characteristics of the plurality of sets of user characteristics. Alternatively and/or additionally, including the plurality of sets of measurements in the measurement report may enable the first entity to determine and/or understand the impact that presentation of the first content item has on driving conversion events for users associated with each set of user characteristics of the plurality of sets of user characteristics.

In some examples, the user targeting profile of the transmission control data structure associated with the first content item and/or the content campaign may be modified based upon the plurality of sets of measurements associated with the plurality of sets user characteristics. In some examples, the user targeting profile may comprise a plurality of target values associated with the plurality of sets of user characteristics. For example, the plurality of target values may be used to determine rates of transmission of the first content item to devices associated with the plurality of sets of user characteristics. In an example, the plurality of target values may comprise a first target value associated with the first set of user characteristics and/or a second target value associated with a second set of user characteristics of the plurality of sets of user characteristics. In an example where the first target value is higher than the second target value, a rate of transmission of the first content item to devices associated with the first set of user characteristics may be higher than a rate of transmission of the first content item to devices associated with the second set of user characteristics.

In some examples, a target value of the plurality of target values may be modified based upon a set of measurements of the plurality of measurements. For example, the first target value associated with the first set of user characteristics may be modified based upon the first set of measurements. For example, the first target value may be increased responsive to a determination that the third conversion rate exceeds a conversion rate threshold, a determination that the third revenue exceeds a revenue threshold, a determination that the third conversion rate is greater than the fourth conversion rate, a determination that the third relationship exceeds a third relationship threshold, a determination that the third revenue is greater than the fourth revenue and/or a determination that the fourth relationship exceeds a fourth relationship threshold. Alternatively and/or additionally, the first target value may be decreased responsive to a determination that the third conversion rate is less than the conversion rate threshold, a determination that the third revenue is less than the revenue threshold, a determination that the third conversion rate is less than the fourth conversion rate, a determination that the third relationship is less than the third relationship threshold, a determination that the third revenue is less than the fourth revenue and/or a determination that the fourth relationship is less than the fourth relationship threshold.

In some examples, a rate of transmission of the first content item to devices associated with the first set of user characteristics may be increased responsive to a determination that the third conversion rate exceeds the conversion rate threshold, a determination that the third revenue exceeds the revenue threshold, a determination that the third conversion rate is greater than the fourth conversion rate, a determination that the third relationship exceeds the third relationship threshold, a determination that the third revenue is greater than the fourth revenue and/or a determination that the fourth relationship exceeds the fourth relationship threshold. Alternatively and/or additionally, a rate of transmission of the first content item to devices associated with the first set of user characteristics may be decreased responsive to a determination that the third conversion rate is less than the conversion rate threshold, a determination that the third revenue is less than the revenue threshold, a determination that the third conversion rate is less than the fourth conversion rate, a determination that the third relationship is less than the third relationship threshold, a determination that the third revenue is less than the fourth revenue and/or a determination that the fourth relationship is less than the fourth relationship threshold.

It may be appreciated that modifying the transmission control data structure to control transmission of the first content item based upon the first conversion information, the second conversion information, the first relationship and/or the second relationship may create a closed-loop process allowing results of the experiment as feedback to tailor parameters of the content system (such as at least one of modifying a rate at which the first content item is transmitted to client devices, modifying a rate at which the first content item is transmitted to client devices associated with a set of user characteristics, modifying the first budget, modifying the first target spend pattern and/or modifying the expiration time). Closed-loop control may reduce errors and produce more efficient operation of a computer system which implements the content system. The reduction of errors and/or the efficient operation of the computer system may improve operational stability and/or predictability of operation. Accordingly, using processing circuitry to implement closed loop control described herein may improve operation of underlying hardware of the computer system.

Figure 5A:
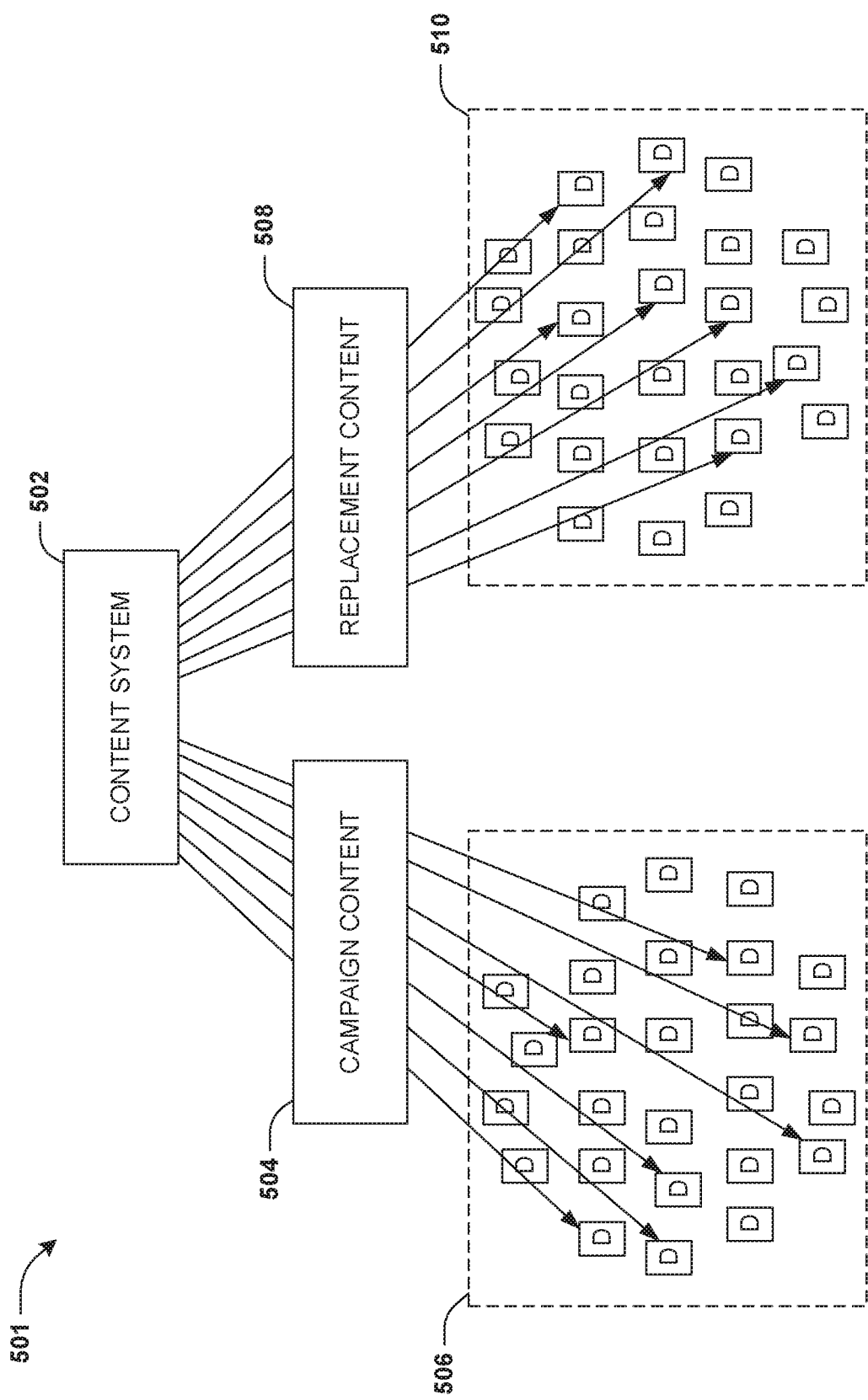
FIG. 5A is a component block diagram illustrating an example system for selecting content items for presentation via devices, where campaign content is transmitted to client devices of a first plurality of client devices and/or replacement content is transmitted to client devices of a second plurality of client devices.

FIGS. 5A-5E illustrate examples of a system 501 for selecting content items for presentation via devices described with respect to the example method 400 of FIG. 4. FIG. 5A illustrates campaign content 504 (such as the first content item associated with the content campaign) being transmitted to client devices of a first plurality of client devices 506 (e.g., the first set of client devices associated with the first group) and/or replacement content 508 (such as the one or more first content items) being transmitted to client devices of a second plurality of client devices 510 (e.g., the second set of client devices associated with the second group). In some examples, the first plurality of client devices 506 may be associated with the first group and/or the second plurality of client devices 510 may be associated with the second group. In some examples, the campaign content 504 and/or the replacement content 508 may be transmitted by a computing system 502 associated with the content system. For example, the computing system 502 may comprise at least one of one or more servers, one or more computing devices, one or more processors, etc. performing operations of the content system.

Figure 5B:
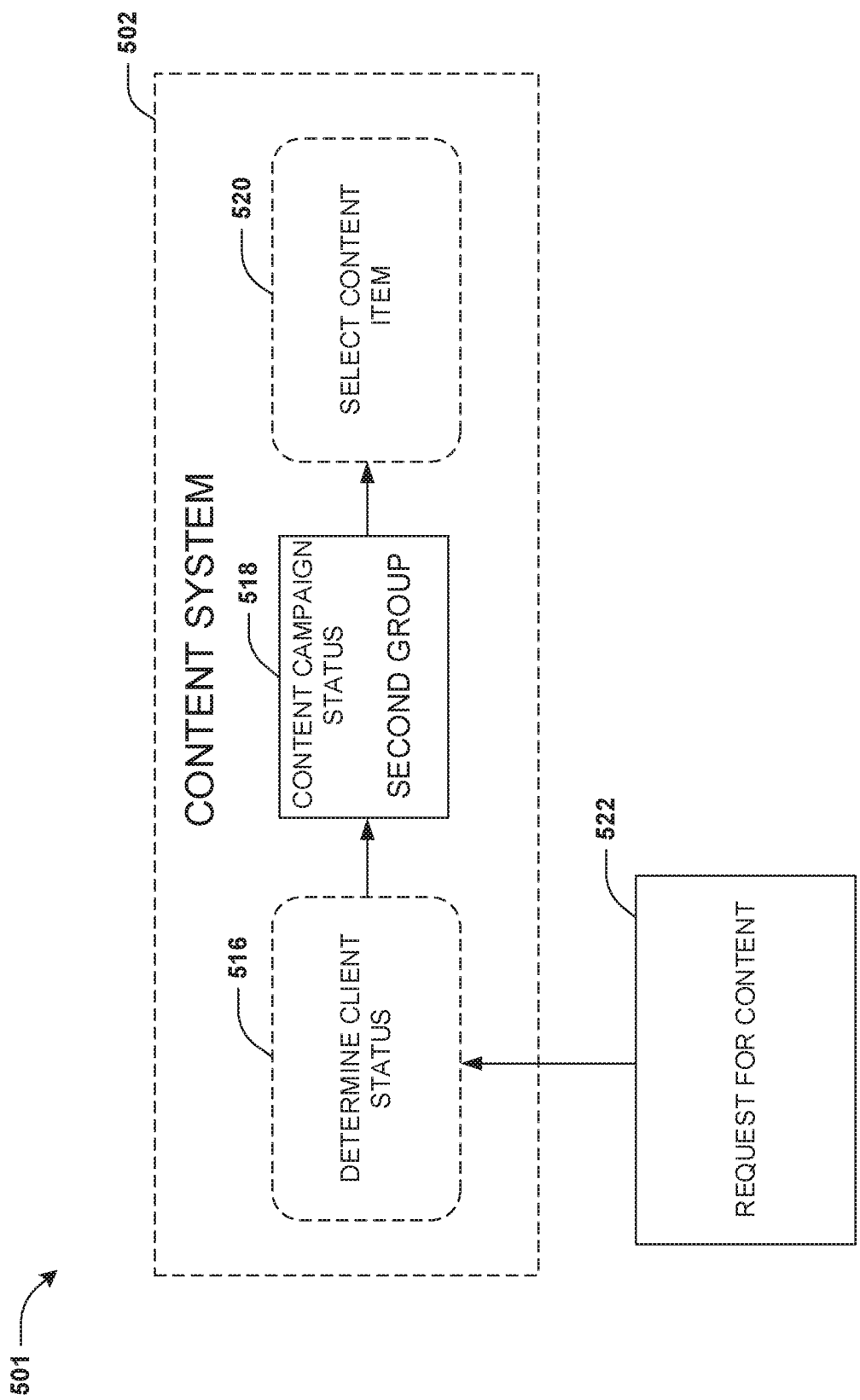
FIG. 5B is a component block diagram illustrating an example system for selecting content items for presentation via devices, where a computing system receives a first request for content associated with a first client device.

FIG. 5B illustrates the computing system 502 receiving a first request for content 522 associated with a first client device 500 (illustrated in FIG. 5C) of the second plurality of client devices 510 associated with the second group. In some examples, the first request for content 522 may be received responsive to the first client device 500 accessing a first internet resource. For example, the first client device 500 may transmit a request to access the first internet resource to a first server associated with the first internet resource. Responsive to receiving the request to access the first internet resource, the first server associated with the first internet resource may transmit the first request for content 522 to the computing system 502. Alternatively and/or additionally, the first request for content 522 may be received from the first client device 500. In some examples, the first request for content 522 may correspond to a request to be provided with a content item (e.g., an advertisement, an image, a link, a video, etc.) for presentation via the first internet resource.

In some examples, the computing system 502 may perform one or more operations 516 to determine a status associated with the first client device 500. For example, a first content campaign status 518 associated with the content campaign may be determined. The first content campaign status 518 may comprise an indication of the second group (e.g., the first content campaign status 518 may be indicative of the first client device 500 being associated with the second group). In some examples, the first content campaign status 518 may be determined based upon an identifier associated with the first client device 500 (e.g., the first request for content 522 may comprise the identifier). For example, the second identifier data structure (associated with the second group) may be analyzed to identify the identifier within the second identifier data structure. Alternatively and/or additionally, the first content campaign status 518 may be determined based upon a user profile associated with the first client device 500 (e.g., the user profile may comprise an indication of the second group). In some examples, the computing system 502 may perform one or more operations 520 to select a content item for presentation via the first client device 500. The one or more operations 520 may be performed based upon the first content campaign status 518.

Figure 5C:
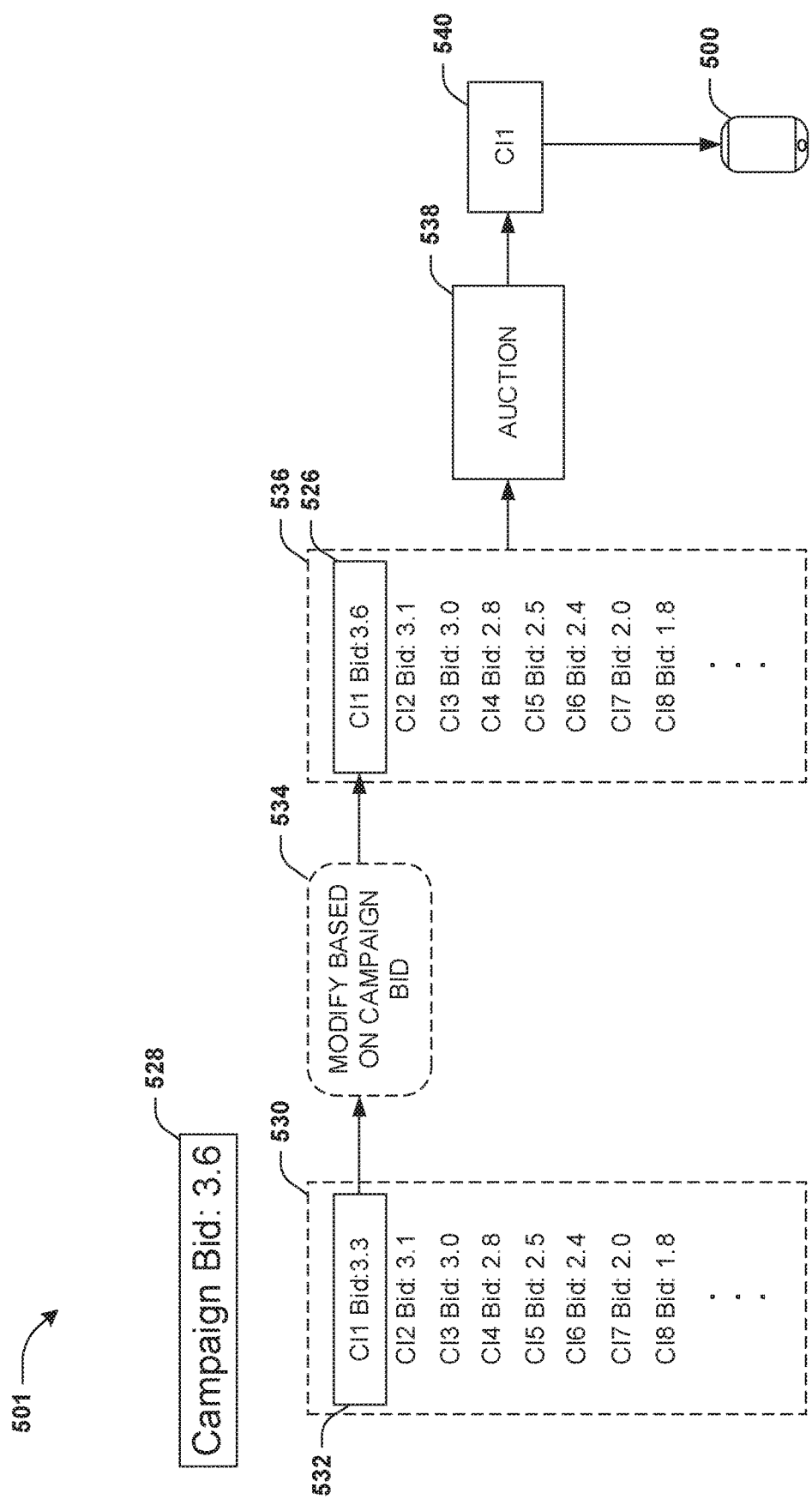
FIG. 5C is a component block diagram illustrating an example system for selecting content items for presentation via devices, where a content item is selected for presentation via a first client device and/or the content item is transmitted to the first client device.

FIG. 5C illustrates a content item "CI1" 540 being selected for presentation via the first client device 500 and/or the content item "CI1" 540 being transmitted to the first client device 500. In some examples, the content item "CI1" 540 may be selected from amongst a first plurality of content items. In some examples, the campaign content 504 (e.g., the first content item associated with the content campaign) may not be included in the first plurality of content items based upon the first content campaign status 518 being indicative of the second group.

In some examples, a first plurality of bid values 530 associated with the first plurality of content items may be determined. The first plurality of bid values 530 may be determined based upon budgets (e.g., daily budgets) and/or target spend patterns associated with the first plurality of content items. In some examples, a first bid value 532 may be selected from the first plurality of bid values 530. The first bid value 532 may be associated with the content item "CI1" 540. The first bid value 532 may be selected based upon a campaign bid value 528 associated with the campaign content 504. In some examples, one or more bid values, of the first plurality of bid values 530, less than the campaign bid value 528 may be determined. The first bid value 532 may be selected responsive to a determination that the first bid value 532 is a highest bid value of the one or more bid values. In some examples, one or more operations 534 may be performed to modify (e.g., increase) the first bid value 532 based upon the campaign bid value 528 to generate a third bid value 526. For example, the first bid value 532 may be increased by a difference between the first bid value 532 and the campaign bid value 528 to generate the third bid value 526 equal to the campaign bid value 528 (e.g., the first bid value 532 may be increased by 0.3).

In some examples, a second plurality of bid values 536 may be determined. The second plurality of bid values 536 may comprise the third bid value 526. The second plurality of bid values 536 may comprise bid values of the first plurality of bid values 530 other than the first bid value 532. In some examples, the second plurality of bid values 536 may be input to an auction module 538. The auction module 538 may be configured to select a content item from the first plurality of content items based upon the second plurality of bid values 536. For example, the auction module 538 may select the content item "CI1" 540 from the first plurality of content items. The content item "CI1" 540 may correspond to a replacement content item due to the content item "CI1"

540 being selected based upon a bid value modified and/or generated based upon the campaign bid value 528. The content item "CI1" 540 may be selected based upon a determination that the third bid value 526 is a highest bid value of the second plurality of bid values 536.

The content item "CI1" 540 may be transmitted to the first client device 500. Alternatively and/or additionally, the content item "CI1" 540 may be presented via the first client device 500. In some examples, a ghost impression indicator (of the first set of ghost impression indicators) may be generated and/or stored based upon transmission of the content item "CI1" 540 to the first client device 500. In an example where a content item different than the content item "CI1" 540 is selected for presentation via the first client device 500, and/or a bid value associated with the content item is not generated and/or modified based upon the campaign bid value 528, a ghost impression indicator may not be stored (e.g., the content item may not correspond to a replacement content item).

Figure 5D:
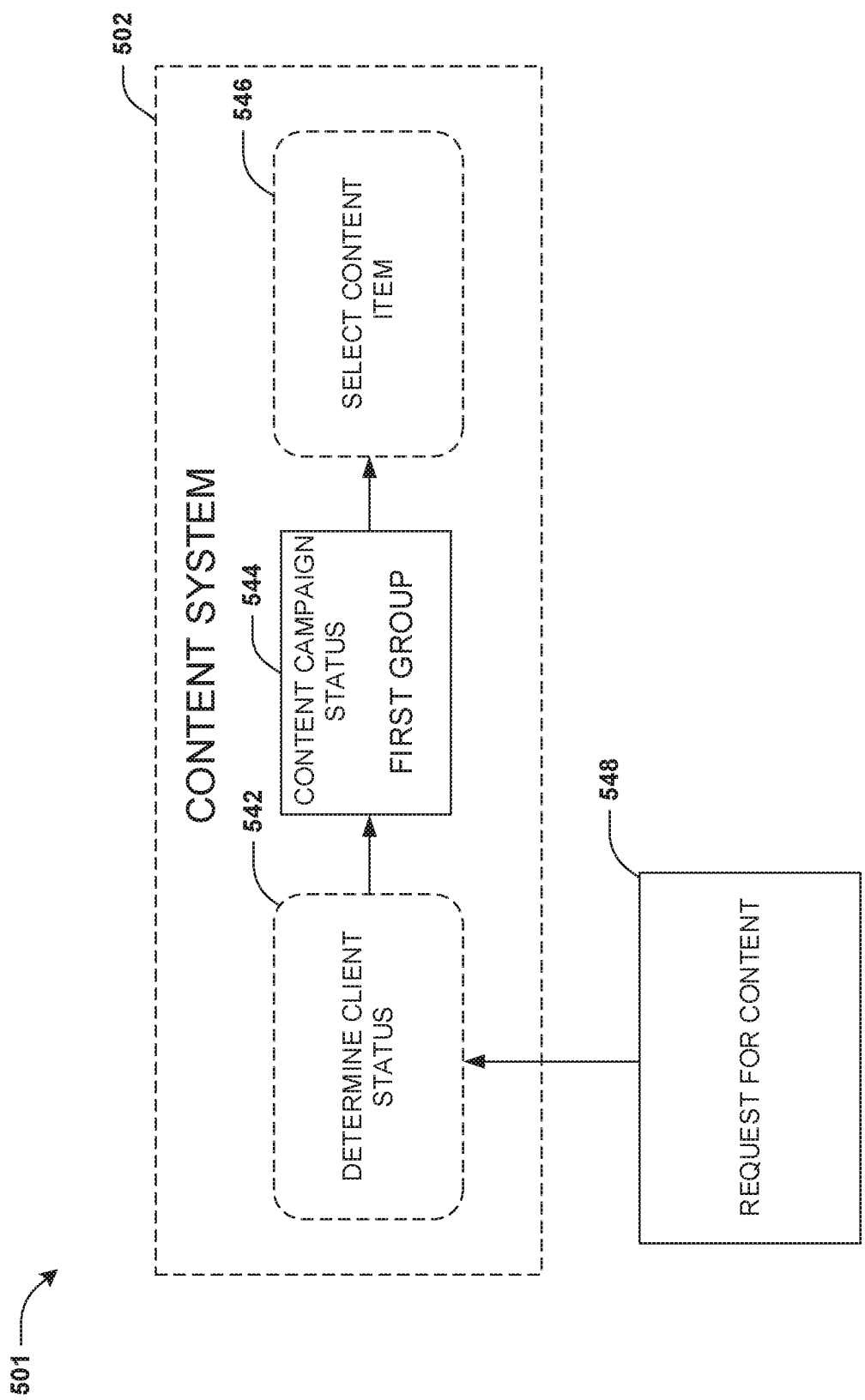
FIG. 5D is a component block diagram illustrating an example system for selecting content items for presentation via devices, where a computing system receives a second request for content associated with a second client device.

FIG. 5D illustrates the computing system 502 receiving a second request for content 548 associated with a second client device 550 (illustrated in FIG. 5E) of the first plurality of client devices 506 associated with the first group. In some examples, the second request for content 548 may be received responsive to the second client device 550 accessing a second internet resource. For example, the second client device 550 may transmit a request to access the second internet resource to a second server associated with the second internet resource. Responsive to receiving the request to access the second internet resource, the second server associated with the second internet resource may transmit the second request for content 548 to the computing system 502. Alternatively and/or additionally, the second request for content 548 may be received from the second client device 550. In some examples, the second request for content 548 may correspond to a request to be provided with a content item (e.g., an advertisement, an image, a link, a video, etc.) for presentation via the second internet resource.

In some examples, the computing system 502 may perform one or more operations 542 to determine a status associated with the second client device 550. For example, a second content campaign status 544 associated with the content campaign may be determined. The second content campaign status 544 may comprise an indication of the first group (e.g., the second content campaign status 544 may be indicative of the first client device being associated with the first group). In some examples, the second content campaign status 544 may be determined based upon an identifier associated with the second client device 550 (e.g., the second request for content 548 may comprise the identifier). For example, the first identifier data structure (associated with the first group) may be analyzed to identify the identifier within the first identifier data structure. Alternatively and/or additionally, the second content campaign status 544 may be determined based upon a user profile associated with the second client device 550 (e.g., the user profile may comprise an indication of the first group). In some examples, the computing system 502 may perform one or more operations 546 to select a content item for presentation via the second client device 550. The one or more operations 546 may be performed based upon the second content campaign status 544.

Figure 5E:
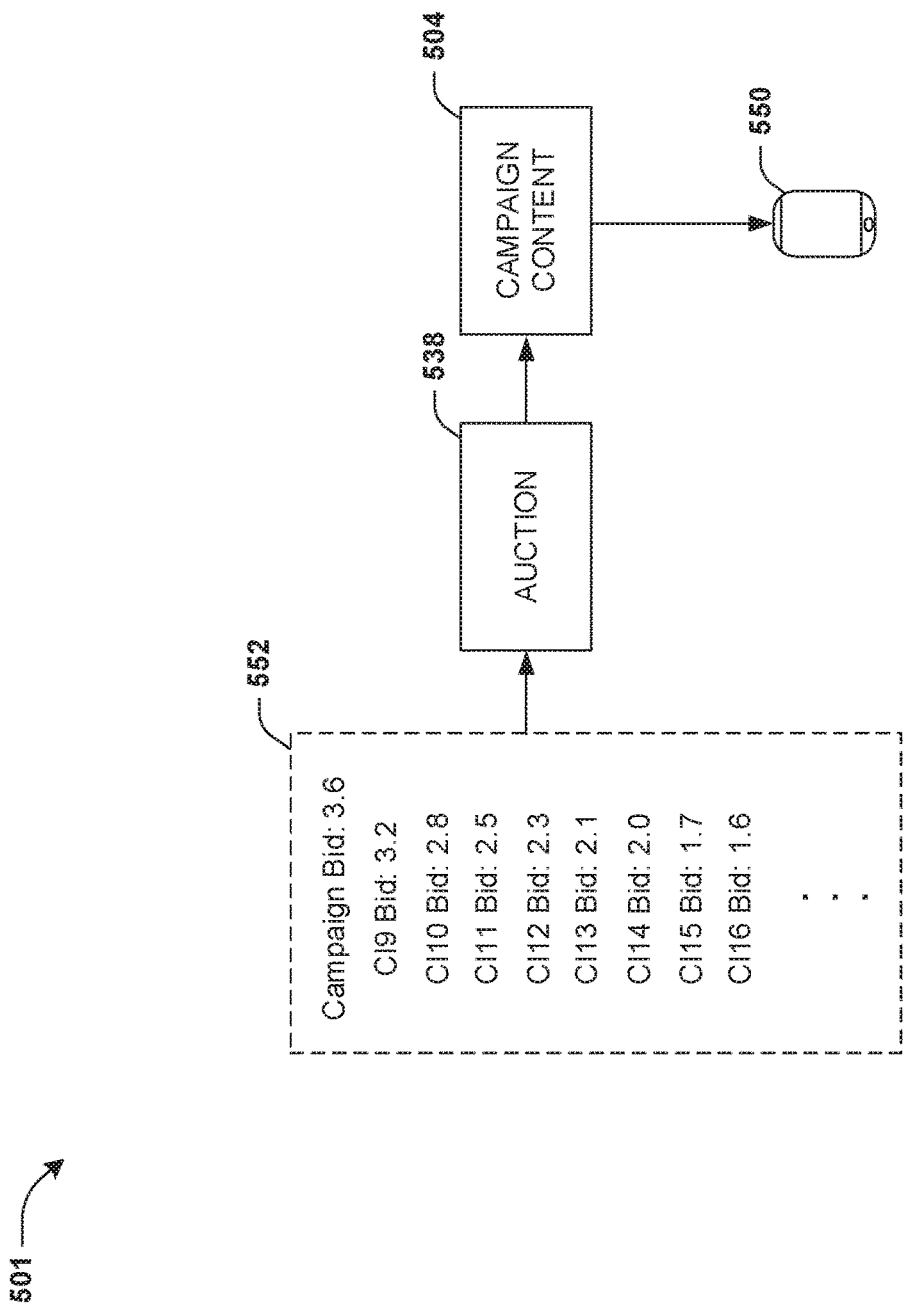
FIG. 5E is a component block diagram illustrating an example system for selecting content items for presentation via devices, where campaign content is selected for presentation via a second client device and/or the campaign content is transmitted to the second client device.

FIG. 5E illustrates the campaign content 504 (e.g., the first content item associated with the content campaign) being selected for presentation via the second client device 550 and/or the campaign content 504 being transmitted to the second client device 550. In some examples, the campaign content 504 may be selected for presentation via the second client device 550 from amongst a second plurality of content items. In some examples, the campaign content 504 may be included in the second plurality of content items based upon the second content campaign status 544 being indicative of the first group.

In some examples, a third plurality of bid values 552 associated with the second plurality of content items may be determined. The third plurality of bid values 552 may be determined based upon budgets (e.g., daily budgets) and/or target spend patterns associated with the second plurality of content items. In some examples, the third plurality of bid values 552 may be input to the auction module 538. The auction module 538 may be configured to select a content item from the second plurality of content items based upon the third plurality of bid values 552. For example, the auction module 538 may select the campaign content 504 from the second plurality of content items. The campaign content 504 may be selected based upon a determination that a bid value associated with the campaign content 504 (e.g., the campaign bid value 528 and/or a different bid value) is a highest bid value of the third plurality of bid values 552. The campaign content 504 may be transmitted to the second client device 550. Alternatively and/or additionally, the campaign content 504 may be presented via the second client device 550. In some examples, an impression indicator (of the first set of impression indicators) may be generated and/or stored based upon transmission of the campaign content 504 to the second client device 550.

It may be appreciated that the disclosed subject matter may assist the first entity (and/or a device associated with the first entity) in receiving accurate measurements (e.g., included in the measurement report), such as at least one of the first conversion rate associated with the first entity, the first quantity of conversion events associated with the first entity, the first revenue associated with the first entity, the second conversion rate associated with the first entity, the second quantity of conversion events associated with the first entity, the second revenue associated with the first entity, the first relationship, the second relationship, etc. For example, the measurements may enable the first entity to determine and/or understand the effectiveness of the first content item and/or determine and/or understand the impact that presentation of the first content item has on driving conversion events.

Implementation of at least some of the disclosed subject matter may lead to benefits including, but not limited to, a more accurate determination of measurements (e.g., as a result of modifying bid values associated with replacement content items based upon a bid value of the content campaign such that a probability that a replacement content item is selected in an auction is the same as and/or similar to a probability that the first content item would be selected had the first content item participated in the auction, etc.).

Alternatively and/or additionally, implementation of the disclosed subject matter may lead to benefits including a reduction in losses incurred as by decreasing and/or preventing transmission of content items to client devices that are not effective and/or do not have an impact on driving users to convert (e.g., as a result of decreasing a rate of transmission of a content item to client devices and/or preventing transmission of the content item to client devices responsive to determining that one or more measurements and/or one or more relationships associated with the content item are less than one or more threshold measurements and/or one or more threshold relationships, etc.).

Alternatively and/or additionally, implementation of the disclosed subject matter may lead to benefits including an increase in generalized revenue for presenting content items via client devices (e.g., as a result of increasing a rate of transmission of a content item to client devices responsive to determining that one or more measurements and/or one or more relationships associated with the content item exceed one or more threshold measurements and/or one or more threshold relationships, etc.).

Alternatively and/or additionally, implementation of at least some of the disclosed subject matter may lead to benefits including a more accurate control of transmission of content items (e.g., as a result of determining one or more measurements and/or one or more relationships associated with a content item, as a result of modifying a rate of transmission of the content item based upon the one or more measurements and/or the one or more relationships, as a result of modifying a transmission control data structure based upon the one or more measurements and/or the one or more relationships, etc.).

Alternatively and/or additionally, implementation of at least some of the disclosed subject matter may lead to benefits including automatic control of transmission of content items without requiring manual effort (e.g., as a result of automatically determining one or more measurements and/or one or more relationships associated with a content item, as a result of automatically modifying a rate of transmission of the content item based upon the one or more measurements and/or the one or more relationships, as a result of automatically modifying a transmission control data structure based upon the one or more measurements and/or the one or more relationships, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
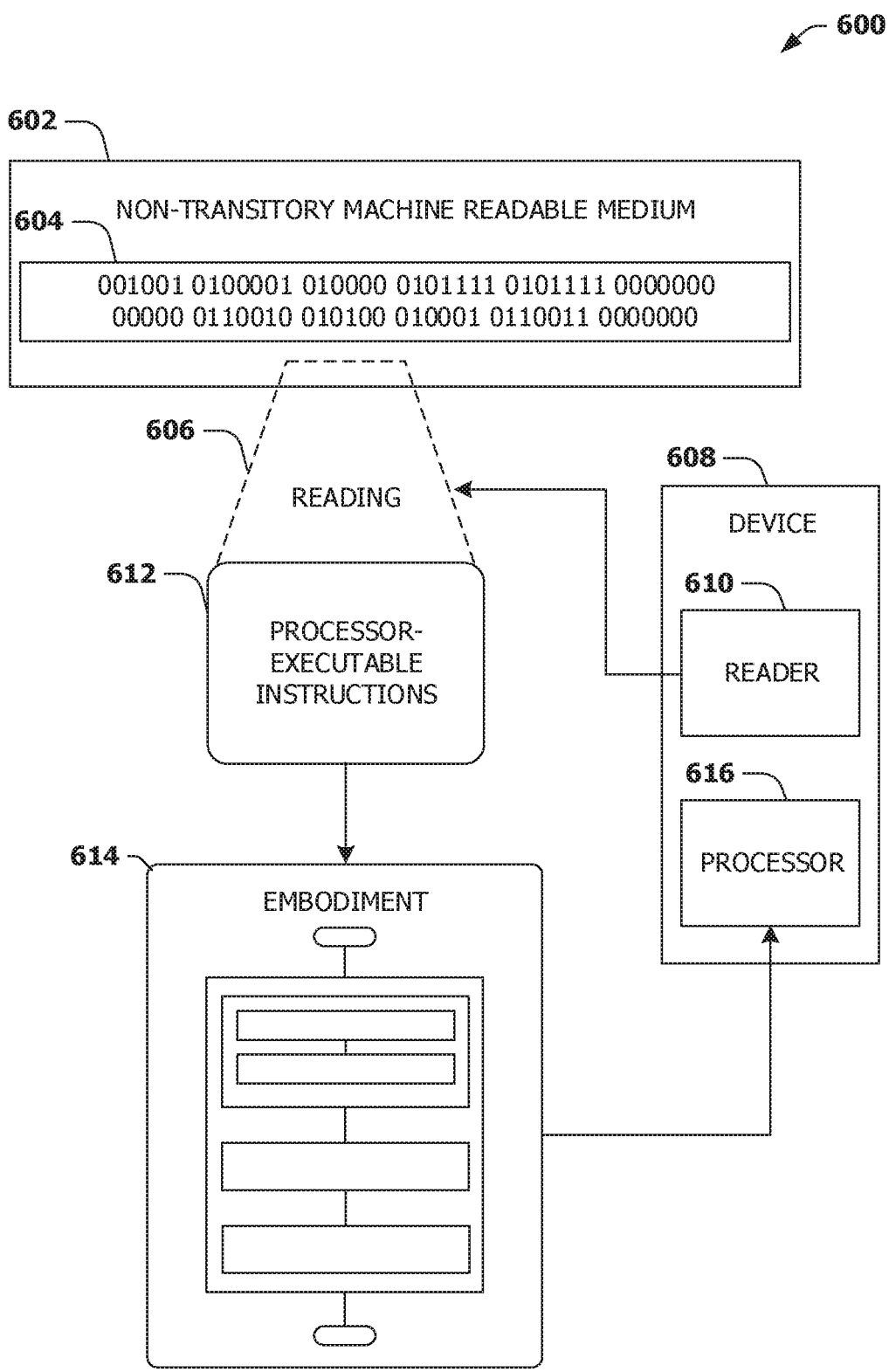
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5E, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   transmitting, by one or more servers of an online content system, a first content item associated with a content campaign to a first set of client devices of a first group, wherein the first content item is associated with a second bid value;
   tracking, by the one or more servers of the online content system, first activity associated with the first set of client devices of the first group;
   receiving, by the one or more servers of the online content system, a first request for content from a first client device of a second group;
   based upon a rate of transmission of content to client devices, determining a bid value for each content item of a first plurality of content items, wherein the determining comprises:
      selecting a first bid value associated with a replacement item to be transmitted in place of the first content item to at least one client device of the second group; and
      modifying, by the one or more servers of the online content system and based upon the second bid value associated with the first content item transmitted to the first set of client devices of the first group, the first bid value associated with the replacement item, that comprises the replacement item to be transmitted to the at least one client device of the second group in place of the first content item, to generate a third bid value associated with the replacement item, wherein the third bid value is closer to the second bid value than the first bid value is to the second bid value,
      wherein after the generating the third bid value, the third bid value is included in a first plurality of bid values associated with the first plurality of content items;
   based upon the first request, performing a bidding process of an auction with participation of the first plurality of content items in association with the first plurality of bid values;
   selecting the replacement item, as a winning item of the auction, based upon a position of the third bid value relative to one or more other bid values of the first plurality of bid values;
   transmitting, by the one or more servers of the online content system, the replacement item to the first client device of the second group based upon the selecting the replacement item;
   tracking, by the one or more servers of the online content system, second activity associated with the first client device of the second group;
   determining a relationship between (i) the first activity tracked by the one or more servers of the online content system and associated with the first set of client devices of the first group and (ii) the second activity tracked by the one or more servers of the online content system and associated with the first client device of the second group;
   modifying, by the one or more servers of the online content system, memory storing a transmission control data structure based upon the relationship between the first activity and the second activity; and
   controlling, by the one or more servers of the online content system, one or more transmissions of the first content item to one or more client devices by accessing the memory and using the transmission control data structure stored in the memory, wherein the controlling the one or more transmissions comprises automatically modifying the rate of transmission of content to client devices.

2. The method of claim 1, comprising transmitting one or more first content items to a second set of client devices, wherein:
   each transmission of a content item of the transmitting the one or more first content items to the second set of client devices is performed responsive to:
      modifying a fourth bid value associated with the content item based upon at least one of the second bid value or a fifth bid value associated with the first content item to generate a sixth bid value; and
      selecting the content item for presentation via a client device of the second set of client devices based upon the sixth bid value.

3. The method of claim 1, comprising:
   transmitting one or more first content items to a second set of client devices;
   storing a first set of impression indicators associated with the transmitting the first content item to the first set of client devices; and
   storing a first set of ghost impression indicators associated with the transmitting the one or more first content items to the second set of client devices, wherein a ghost impression indicator of the first set of ghost impression indicators is stored responsive to at least one of:
      a content item of the one or more first content items being selected for presentation via a client device of the second set of client devices based upon a fourth bid value generated based upon at least one of the second bid value or a fifth bid value associated with the first content item;
      the content item being transmitted to the client device; or
      the content item being presented via the client device.

4. The method of claim 1, comprising:
   transmitting one or more first content items to a second set of client devices;
   analyzing messages associated with the first set of client devices to determine first conversion information associated with the first set of client devices; and
   analyzing messages associated with the second set of client devices to determine second conversion information associated with the second set of client devices.

5. The method of claim 4, comprising:
   generating, based upon the first conversion information and the second conversion information, a measurement report associated with the content campaign.

6. The method of claim 5, wherein:
the determining the first conversion information comprises determining a first conversion rate associated with the first set of client devices;
the first conversion information is indicative of the first conversion rate;
the determining the second conversion information comprises determining a second conversion rate associated with the second set of client devices; and
the second conversion information is indicative of the second conversion rate.

7. The method of claim 6, comprising:
determining, based upon the first conversion information and the second conversion information, a first relationship between the first conversion rate and the second conversion rate, wherein the measurement report is indicative of the first relationship between the first conversion rate and the second conversion rate.

8. The method of claim 5, wherein:
the determining the first conversion information comprises determining a first revenue associated with the first set of client devices;
the first conversion information is indicative of the first revenue;
the determining the second conversion information comprises determining a second revenue associated with the second set of client devices; and
the second conversion information is indicative of the second revenue,
the method comprising:
determining, based upon the first conversion information and the second conversion information, a first relationship between the first revenue and the second revenue, wherein the measurement report is indicative of the first relationship between the first revenue and the second revenue.

9. The method of claim 5, comprising:
transmitting the measurement report to a third client device associated with the content campaign.

10. The method of claim 4, wherein:
the determining the first conversion information comprises determining a first conversion rate associated with the first set of client devices;
the first conversion information is indicative of the first conversion rate;
the determining the second conversion information comprises determining a second conversion rate associated with the second set of client devices; and
the second conversion information is indicative of the second conversion rate,
the method comprising:
determining, based upon the first conversion information and the second conversion information, a first relationship between the first conversion rate and the second conversion rate; and
modifying, based upon the first relationship, the transmission control data structure associated with the content campaign.

11. The method of claim 10, wherein:
the first relationship is indicative of a difference between the first conversion rate and the second conversion rate.

12. The method of claim 1, comprising:
identifying a plurality of client devices;
assigning a third set of client devices of the plurality of client devices to the first group; and
assigning a fourth set of client devices of the plurality of client devices to the second group, wherein the first group and the second group are associated with the content campaign.

13. The method of claim 12, comprising:
transmitting one or more first content items to a second set of client devices;
determining that the first set of client devices are assigned to the first group, wherein the transmitting the first content item to the first set of client devices is performed based upon the determining that the first set of client devices are assigned to the first group; and
determining that the second set of client devices are assigned to the second group, wherein the transmitting the one or more first content items to the second set of client devices is performed based upon the determining that the second set of client devices are assigned to the second group.

14. The method of claim 1, comprising:
receiving a second request for content associated with a second client device;
determining a second plurality of bid values associated with a second plurality of content items, wherein:
the second plurality of content items comprises the first content item; and
the second plurality of bid values comprises at least one of the second bid value or a fourth bid value associated with the first content item; and
selecting, based upon the second plurality of bid values, the first content item from the second plurality of content items for presentation via the second client device, wherein the transmitting the first content item to the first set of client devices comprises transmitting the first content item to the second client device based upon the selecting the first content item for presentation via the second client device.

15. The method of claim 1, wherein the selecting the first bid value comprises:
determining one or more first bid values that are less than the second bid value associated with the first content item; and
determining that the first bid value is a highest bid value of the one or more first bid values.

16. The method of claim 1, wherein:
a first difference, between a first probability of selection of the replacement item in association with the third bid value and a second probability of selection of the first content item in association with the second bid value if the first content item were included in the first plurality of content items, is less than
a second difference between a third probability of selection of the replacement item in association with the first bid value and the second probability of selection of the first content item in association with the second bid value if the first content item were included in the first plurality of content items.

17. The method of claim 1, wherein the modifying the first bid value to generate the third bid value comprises:
generating the third bid value, associated with the replacement item, that is equal to the second bid value associated with the first content item.

18. The method of claim 1, wherein the selecting the replacement item for presentation via the first client device comprises:
determining that the third bid value is a highest bid value of the first plurality of bid values.

19. A computing device comprising:
a processor; and
memory comprising processor-executable instructions that when executed by the processor cause performance of operations, the operations comprising:
- transmitting, by one or more servers of an online content system, a first content item associated with a content campaign to a first set of client devices of a first group, wherein the first content item is associated with a second bid value;
- receiving, by the one or more servers of the online content system, a first request for content from a first client device;
- based upon a rate of transmission of content to client devices, determining a bid value for each content item of a first plurality of content items, wherein the determining comprises:
  - selecting a first bid value associated with a replacement item to be transmitted in place of the first content item to at least one client device; and
  - modifying, by the one or more servers of the online content system and based upon the second bid value associated with the first content item transmitted to the first set of client devices of the first group, the first bid value associated with the replacement item, that comprises the replacement item to be transmitted to the at least one client device in place of the first content item, to generate a third bid value associated with the replacement item, wherein the third bid value is closer to the second bid value than the first bid value is to the second bid value,
  - wherein after the generating the third bid value, the third bid value is included in a first plurality of bid values associated with the first plurality of content items;
- based upon the first request, performing an auction with participation of the first plurality of content items in association with the first plurality of bid values;
- selecting the replacement item, as a winning item of the auction, based upon a position of the third bid value relative to one or more other bid values of the first plurality of bid values;
- transmitting, by the one or more servers of the online content system, one or more first content items to a second set of client devices comprising the first client device, wherein the transmitting the one or more first content items to the second set of client devices comprises transmitting the replacement item to the first client device based upon the selecting the replacement item for presentation via the first client device;
- determining first conversion information associated with the first set of client devices based upon activity associated with the first set of client devices;
- determining second conversion information associated with the second set of client devices based upon activity associated with the second set of client devices;
- generating, based upon the first conversion information and the second conversion information, a measurement report associated with the content campaign;
- modifying, by the one or more servers of the online content system, a transmission control data structure based upon the first conversion information and the second conversion information; and
- controlling, by the one or more servers of the online content system, one or more transmissions of the first content item to one or more client devices based upon the transmission control data structure, wherein the controlling the one or more transmissions comprises automatically modifying the rate of transmission of content to client devices.

20. A non-transitory machine readable medium having stored thereon processor-executable instructions that when executed cause performance of operations, the operations comprising:
- transmitting, by one or more servers of an online content system, a first content item associated with a content campaign to a first set of client devices, wherein the first content item is associated with a second bid value;
- receiving, by the one or more servers of the online content system, a first request for content from a first client device;
- based upon a rate of transmission of content to client devices, determining a bid value for each content item of a first plurality of content items, wherein the determining comprises:
  - selecting a first bid value associated with a replacement item to be transmitted in place of the first content item to at least one client device; and
  - modifying, based upon the second bid value associated with the first content item transmitted to the first set of client devices, the first bid value associated with the replacement item, that comprises the replacement item to be transmitted to the at least one client device in place of the first content item, to generate a third bid value associated with the replacement item, wherein the third bid value is closer to the second bid value than the first bid value is to the second bid value,
  - wherein after the generating the third bid value, the third bid value is included in a first plurality of bid values associated with the first plurality of content items;
- based upon the first request, performing an auction with participation of the first plurality of content items in association with the first plurality of bid values;
- selecting the replacement item, as a winning item of the auction, based upon a position of the third bid value relative to one or more other bid values of the first plurality of bid values;
- transmitting, by the one or more servers of the online content system, the replacement item to the first client device based upon the selecting the replacement item;
- determining a relationship between (i) first activity associated with the first set of client devices and (ii) second activity associated with the first client device;
- modifying, by the one or more servers of the online content system, a transmission control data structure based upon the relationship between the first activity and the second activity; and
- controlling, by the one or more servers of the online content system, one or more transmissions of the first content item to one or more client devices based upon the transmission control data structure, wherein the controlling the one or more transmissions comprises automatically modifying the rate of transmission of content to client devices.

* * * * *